(12) United States Patent
Burnett

(10) Patent No.: US 9,845,817 B2
(45) Date of Patent: Dec. 19, 2017

(54) CLAMPING SYSTEM

(71) Applicant: David Burnett, Lone Tree, CO (US)

(72) Inventor: David Burnett, Lone Tree, CO (US)

( * ) Notice: Subject to any disclaimer, the term of this patent is extended or adjusted under 35 U.S.C. 154(b) by 111 days.

(21) Appl. No.: 14/968,667

(22) Filed: Dec. 14, 2015

(65) Prior Publication Data
US 2016/0333908 A1   Nov. 17, 2016

Related U.S. Application Data

(63) Continuation-in-part of application No. 14/711,323, filed on May 13, 2015.

(51) Int. Cl.
| | |
|---|---|
| *B25B 5/00* | (2006.01) |
| *F16B 2/18* | (2006.01) |
| *B25B 5/16* | (2006.01) |
| *F16B 2/10* | (2006.01) |
| *B25B 5/04* | (2006.01) |
| *B25B 5/12* | (2006.01) |

(52) U.S. Cl.
CPC .............. *F16B 2/185* (2013.01); *B25B 5/04* (2013.01); *B25B 5/12* (2013.01); *B25B 5/16* (2013.01); *F16B 2/10* (2013.01)

(58) Field of Classification Search
CPC .......... B25B 5/067; B25B 5/082; B25B 5/101
See application file for complete search history.

(56) References Cited

U.S. PATENT DOCUMENTS

| | | | | |
|---|---|---|---|---|
| 2,466,937 | A * | 4/1949 | Downs ..................... | B25B 5/10 269/143 |
| 2,549,256 | A * | 4/1951 | Sparling ................ | B25B 5/101 269/223 |
| 4,234,176 | A * | 11/1980 | Goff ....................... | B25B 5/109 269/156 |
| 4,258,908 | A * | 3/1981 | Goff ....................... | B25B 5/103 269/239 |
| 4,979,273 | A * | 12/1990 | Friedrickson, Jr. ....... | F16B 2/12 24/514 |
| 8,025,279 | B2 * | 9/2011 | Seber ..................... | B25B 5/101 269/143 |
| 8,322,697 | B2 * | 12/2012 | Lin ........................ | B25B 5/003 269/143 |
| 8,814,155 | B2 * | 8/2014 | Prins ..................... | B25B 5/101 269/143 |
| 2016/0333908 | A1 * | 11/2016 | Burnett ................... | F16B 2/185 |

* cited by examiner

*Primary Examiner* — Lee D Wilson
(74) *Attorney, Agent, or Firm* — K&L Gates LLP; Thomas A. Turano; Robert W. Winn

(57) ABSTRACT

A clamping system that includes a first jaw, a second jaw—the second jaw being pivotally connected to the first jaw—a locking handle pivotally connected to the first and second jaws, an adjustment element, first and second lever arms, and a release lever secured to the locking handle and configured to move the locking handle away from the first jaw.

19 Claims, 21 Drawing Sheets

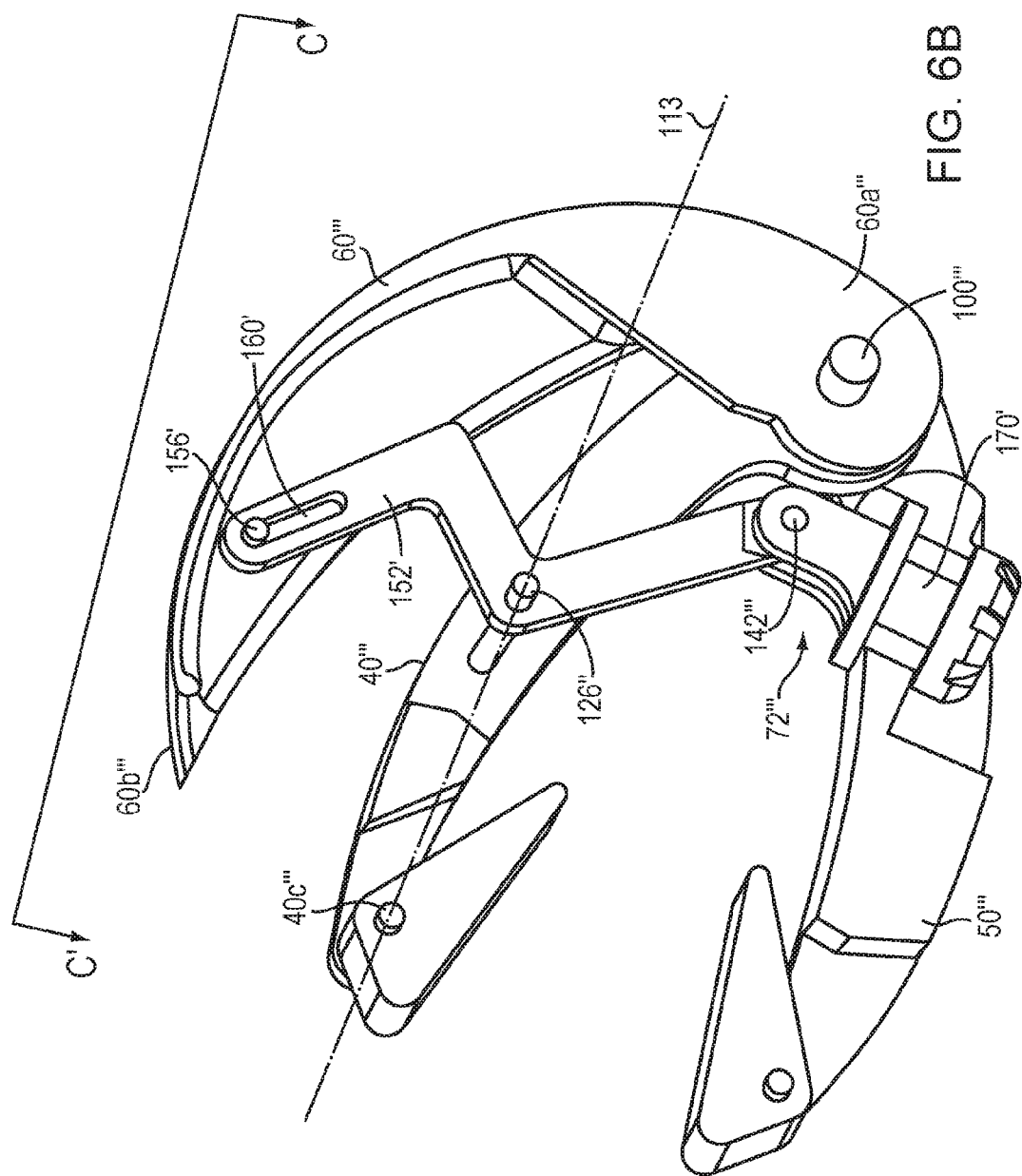

CLAMPING SYSTEM

CROSS-REFERENCE TO RELATED APPLICATION

This application is a continuation-in-part application of U.S. application Ser. No. 14/711,323 filed May 13, 2015, the entirety of which is incorporated herein by reference.

FIELD OF THE INVENTION

The present disclosure relates generally to clamping systems and more specifically to industrial clamps as well as their methods of manufacture and use.

DESCRIPTION OF PRIOR ART

Clamping devices are well known. Numerous designs of clamps have been used in a variety of industries from carpentry to manufacturing to medical uses. For instance, clamps are used extensively by carpenters when securing two elements together; in manufacturing environments by tool and die makers; and by doctors in surgical procedures (e.g., to "clamp-off" arteries). Depending on the application, clamps come in any number of shapes and sizes.

Adjustment of size of the typical industrial clamp is time consuming and the release of the clamp can be problematic due to the stresses placed on the clamp when gripping an object firmly. What is needed is an adjustable quick locking and quick releasing clamp.

The present invention addresses this need.

SUMMARY OF THE INVENTION

The invention relates to a clamping system. In one embodiment, the clamping system includes a first jaw, a second jaw, a locking handle, a first lever arm, a second lever arm, a third lever arm, a fourth lever arm, an adjustment element, and a release lever. In another embodiment, the first jaw, the second jaw, and the locking handle, the first lever arm, the second lever arm, the third lever arm, and the fourth lever arm, respectively, have first and second ends. In another embodiment, the second jaw is pivotally connected to the first jaw at a first pivot located at the respective first ends of the first and second jaw. In another embodiment, the adjustment element is secured near the first end of the second jaw. In another embodiment, the second end of the first lever arm is pivotally connected to the first jaw and the second lever arm at a second pivot. In another embodiment, the second end of the second lever arm is pivotally connected to the locking handle at a third pivot positioned between the first and second ends of the locking handle. In another embodiment, the first end of the first lever arm is connected to the second end of the third lever arm at a fourth pivot. In another embodiment, the first end of the third lever arm is pivotally connected to the adjustment element at a fifth pivot. In another embodiment, the first end of the fourth lever arm is pivotally connected to the first end of the locking handle, and the second end of the fourth lever arm is pivotally connected the adjustment element at the fifth pivot. In another embodiment, the adjustment element is configured to establish a closed configuration between the first jaw and the second jaw. In another embodiment, the release lever is pivotally connected to the locking handle at a position at or near the second end of the locking handle.

In another embodiment, the release lever is configured to move the locking handle away from the first jaw to an open configuration.

In another embodiment, the adjustment element comprises a bolt that is connected to the first end of the third lever arm, and rotation of the bolt causes the first end of the third lever arm to move either toward or away from the first end of the second jaw. In another embodiment, a hook or loop is secured to the second jaw toward the first end of the second jaw. In another embodiment, the first jaw comprises a pad pivotally connected at the second end of the first jaw. In another embodiment, the second jaw comprises a pad pivotally connected at the second end of the second jaw.

In another embodiment, the second pivot and the third pivot define a first imaginary line, and the second pivot and the fourth pivot define a second imaginary line, wherein first and second imaginary lines define an angle in the open configuration that is greater than 0°. In another embodiment, the first and second imaginary lines define an angle that is less than 0° when the clamping system is in the closed configuration. In another embodiment, the third pivot and the fourth pivot define a third imaginary line, and the second pivot is located below the third imaginary line when the clamping system is in the open configuration and above the third imaginary line when the clamping system is in the closed configuration.

In another embodiment, the second jaw comprises a top portion and a bottom portion, wherein the top and bottom portions define substantially parallel planes. In another embodiment, the adjustment element is positioned between the top and bottom plates of the second jaw. In another embodiment, each of the top and bottom plates of second jaw include a channel configured to allow the fifth pivot to move forward and backward relative to the adjustment element.

In another embodiment, the fourth lever arm comprises a top portion and a bottom portion, each defining a plane such that the two planes are substantially parallel to each other. In another embodiment, the top and bottom portions of the fourth lever arm are positioned on the outside of the second jaw. In another embodiment, the third lever arm is positioned between the planes defined by the top and bottom portions of the fourth lever arm. In another embodiment, the adjustment element comprises a rotatable, threaded element.

In one embodiment of a clamping system, the system includes a first, second, and third lever arms. In another embodiment, each of the first, second, and third lever arms has first and second ends. In another embodiment, the second end of the first lever arm is pivotally connected to the second lever arm at a first pivot. In another embodiment, the first end of the first lever arm is connected to the second end of the third lever arm at a second pivot. In another embodiment, the second end of the second lever arm and the first pivot define a first imaginary line. In another embodiment, the first pivot and the second pivot define a second imaginary line. In another embodiment, the clamping system occupies an open configuration when an angle between the first and second imaginary lines is greater than 0°, and the clamping system occupies a closed configuration when an angle between the first and second imaginary lines is less than 0°.

In another embodiment, an adjustment element is pivotally secured to the first end of the third lever arm. In another embodiment, the adjustment element is configured to adjust the relative positions of the first pivot, the second pivot, and the second end of the second lever arm.

In one embodiment of a clamping system, the system includes first, second, and third lever arms, each having first and second ends. In another embodiment, the second end of the first lever arm is pivotally connected to the second lever arm at a first pivot. In another embodiment, the first end of the first lever arm is connected to the second end of the third lever arm at a second pivot. In another embodiment, the second end of the second lever arm and the second pivot define an imaginary line. In another embodiment, the clamping system occupies an open configuration when the first pivot is positioned below the imaginary line and the clamping system occupies a closed configuration when the first pivot is positioned above the imaginary line.

In another embodiment, an adjustment element is pivotally secured to the first end of the third lever arm. In another embodiment, the adjustment element is configured to adjust the relative positions of the first pivot, the second pivot, and the second end of the second lever arm.

In one embodiment the clamping system includes a first jaw, a second jaw, a locking handle, a first lever arm, a second lever arm, an adjustment element, and a release lever. In another embodiment, the first jaw includes a first and a second end. In yet another embodiment the second jaw includes a first and a second end. In still another embodiment, the second jaw is pivotally connected to the first jaw at a first pivot located at the respective first ends of the first and second jaws. In still yet another embodiment, the locking handle, which also has a first and a second end, is connected to the first pivot at its first end. In another embodiment, the first lever arm has a first end and second end and is pivotally connected to the second lever arm at a second pivot positioned on the second lever arm between first and second ends of the second lever arm. In another embodiment, the second end of the first lever arm is pivotally connected to the first jaw at a third pivot. In yet another embodiment, the second end of the second lever arm is pivotally connected to the locking handle at a fourth pivot positioned between the first and second ends of the locking handle. In another embodiment, the first end of the second lever arm is connected to the adjustment element.

In another embodiment, the adjustment element is configured to establish a position between the locking handle and the second jaw. In yet another embodiment a release lever is pivotally connected to the locking handle at a position near the second end of the locking handle. In still yet another embodiment, the release lever, when rotated about its pivot on the locking handle, is configured to move the locking handle away from a first position adjacent the first jaw and into a second open position.

In one embodiment, the adjustment element includes a cam and a locking bar configured to releasably make contact with each other. In another embodiment, the cam comprises an oval shape. In yet another embodiment, at least one of the cam and the locking bar includes an abrasive surface. In another embodiment the adjustment element is a threaded member.

In one embodiment, the first jaw includes a first pad pivotally attached to the second end of the first jaw. In another embodiment, the second jaw includes a second pad pivotally attached to the second end of the second jaw. In yet another embodiment, the first jaw includes a first pad pivotally attached to the second end of the first jaw, and the second jaw includes a second pad pivotally connected at the second end of the second jaw.

In one embodiment, the clamping system further includes a first lever arm and a second lever arm. In another embodiment, the first lever arm has a first end and a second end and defines a longitudinal axis. In another embodiment, the first lever arm is non-linear and has a first end and a second end that are not co-linear. In yet another embodiment, the second lever arm is non-linear and has a first end and a second end that are not co-linear. In some embodiments, the second end of the second lever arm is pivotally connected to the locking handle at a fourth pivot that is positioned between the first and second ends of the locking handle.

In some embodiments, the second lever arm includes a first and a second portion, each portion extending away from the second pivot. In some embodiments, the first and second portions define an angle that is less than 180 degrees. In some embodiments, the first lever arm between the second pivot and the third pivot defines a first longitudinal axis. In some embodiments, the first portion of the second lever arm between the second pivot and the fourth pivot defines a second longitudinal axis. In some embodiments, the first and second longitudinal axes define a first angle when the clamping system is in the first closed position and define a second angle when the clamping system is in the second open position. In some embodiments, the first angle is less than the second angle. In some embodiments, the first angle is between about 10 degrees and about 40 degrees. In some embodiments, the first angle is between about 20 degrees and about 30 degrees. In some embodiments, the first angle is about 24 degrees.

According to some embodiments, the third pivot is positioned below the first longitudinal axis when the clamping system is in the first closed position, and the third pivot is positioned above the first longitudinal axis when the clamping system is in the second open position.

In yet another embodiment, the clamping system includes a non-geometric member with three portions. A first portion is pivotally connected to the adjustment element and a second portion is pivotally connected to the first jaw. A third portion contains a longitudinal slot into which a rod connected to the handle portion is moveably inserted. In some embodiments, the connection between the second portion and the first jaw comprises a longitudinal slot in the first jaw configured to receive a rod protruding from the second portion.

In some embodiments, the adjustment element comprises a turnbuckle. In some embodiments, the adjustment element comprises an adjustable screw and threaded member. In some embodiments, the adjustment element comprises a serrated element and an interlocking pin element.

In some embodiments, at least one of the first and second jaws defines a curve. In some embodiments, the first and second jaws define respective curves with the arc of each curve extending in opposite directions. In some embodiments, the locking handle defines a curve. In some embodiments, the first jaw and the locking handle each define curves whose respective arcs extend in the same direction.

According to some embodiments disclosed herein, a clamping system includes a first jaw having first and second ends, a second jaw having first and second ends—the second jaw being pivotally connected to the first jaw at a first pivot located at the respective first ends of the first and second jaw—a locking handle having first and second ends and connected to the first pivot, a first lever arm having a first end and a second end, and a second lever arm having a first end and a second end—the first end being pivotally connected to an adjustment element at a second pivot.

In some embodiments, the first end of the first lever arm is pivotally connected to the second lever arm at a third pivot positioned between the first and second ends of the second lever arm, and the second end of the first lever arm is pivotally connected to the first jaw at a fourth pivot. In some embodiments, the second end of the second lever arm is pivotally connected to the locking handle at a fifth pivot positioned between the first and second ends of the locking handle. In some embodiments, when the clamping system is in a locked position, the third pivot is located below a longitudinal axis formed between the second pivot and the fourth pivot. In some embodiments, when the clamping system is in an unlocked position, the third pivot is located above a longitudinal axis formed between the second pivot and the fourth pivot. Some embodiments further include an adjustment element positioned between and connected to the second jaw and the second lever arm.

According to some embodiments disclosed herein, a clamping system includes a first jaw having first and second ends, a second jaw having first and second ends—the second jaw being pivotally connected to the first jaw—a locking handle having first and second ends and pivotally connected to the first jaw and the second jaw, a lever system or non-geometric member pivotally connected to the locking handle, the first jaw, and an extension.

In some embodiments, a longitudinal axis is formed between second end of first jaw the first pivot between the non-geometric member and the extension. In some embodiments, the second pivot between the non-geometric member and the first jaw is positioned below the longitudinal axis when the clamping system is in a closed position and above the longitudinal axis when the clamping system is in an open position. In some embodiments, movement of the locking handle adjusts the position of the second pivot above and below the longitudinal axis. Some embodiments further include comprising a release lever configured to move the locking handle relative to the first jaw. In some embodiments, the respective first ends a first jaw, second jaw, and locking handle each comprise planes and are pivotally connected to each other by way of a shaft that is perpendicular to the parallel planes. In some embodiments, the extension is adjustable.

These and other features are explained in greater detail below.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

FIG. 6(B) is a longitudinal cross-sectional view taken along line C-C' of FIG. 6(A) illustrating an embodiment of the clamp with a lever arm having with three portions where the clamp is in an open configuration.

FIG. 7AA is a partially rotated view of the embodiment illustrated in FIG. 7A.

FIG. 7BB. is a partially rotated view of the arrangement illustrated in FIG. 7B.

FIG. 7DD is a partially disassembled view illustrating the various components of the adjustment element highlighted in FIG. 7D.

DETAILED DESCRIPTION OF AN EMBODIMENT OF THE INVENTION

Figure 1A:
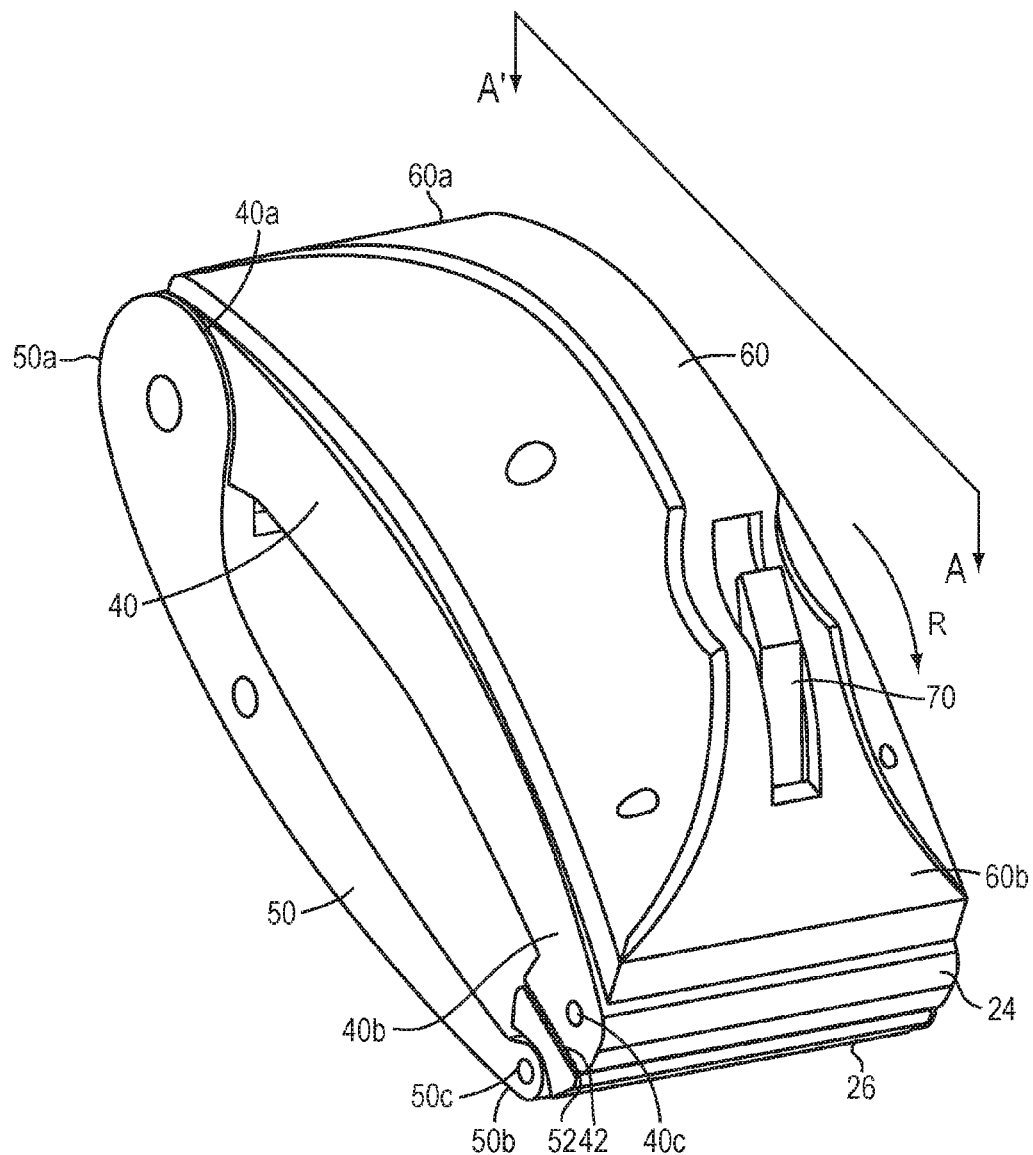
FIG. 1(A) is a perspective front oblique view of one embodiment of the invention in the closed position.

In broad overview, a clamping system of the invention includes, in one embodiment shown in FIG. 1(A), a first jaw 40 having a first end 40(*a*) and a second end 40(*b*) and a second jaw 50 also having a first end 50(*a*) and a second end 50(*b*). In one embodiment, pivotally attached to the second end 40(*b*) of the first jaw 40 and the second end 50(*b*) of the second jaw 50 are first 24 and second jaw pads 26, respectively. When the item to be clamped is placed between the first jaw pad 24 and second jaw pad 26, the pads 24 and 26 rotate about their respective pivot points 40(*c*), 50(*c*) to place the contact surfaces 42 and 52, respectively, of the jaw pads 24 and 26 tangentially to the surface of the object being gripped.

Figure 1B:
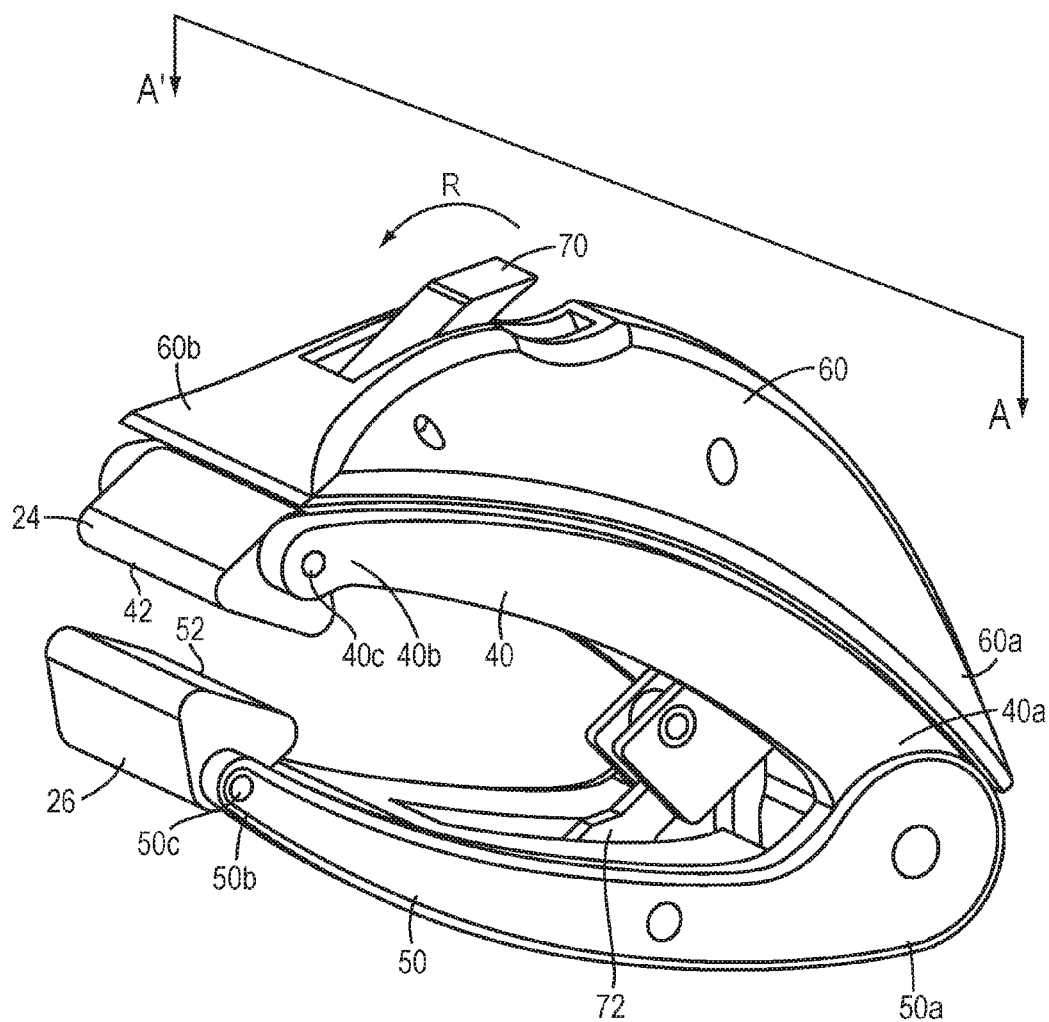
FIG. 1(B) is a perspective side oblique view of one embodiment of the invention in a partially released position.

Positioned adjacent the first jaw 40 is a locking handle 60 which has a first end 60(*a*) and a second end 60(*b*). FIG. 1(A) shows the clamping system in a closed position. Near the second end 60(*b*) of the locking handle 60 is a release lever 70 which is used to release the clamping system when the clamping system is in the closed position. When release lever 70 is rotated (arrow R) towards the second end 60(*b*) of the locking handle 60 as shown in FIG. 1(B), the locking handle 60 moves away from the first jaw 40 and the locking mechanism (described below) of the clamping system is released allowing the first 40 and second 50 jaws to move away from one another (FIG. 1(C)).

Figure 1C:
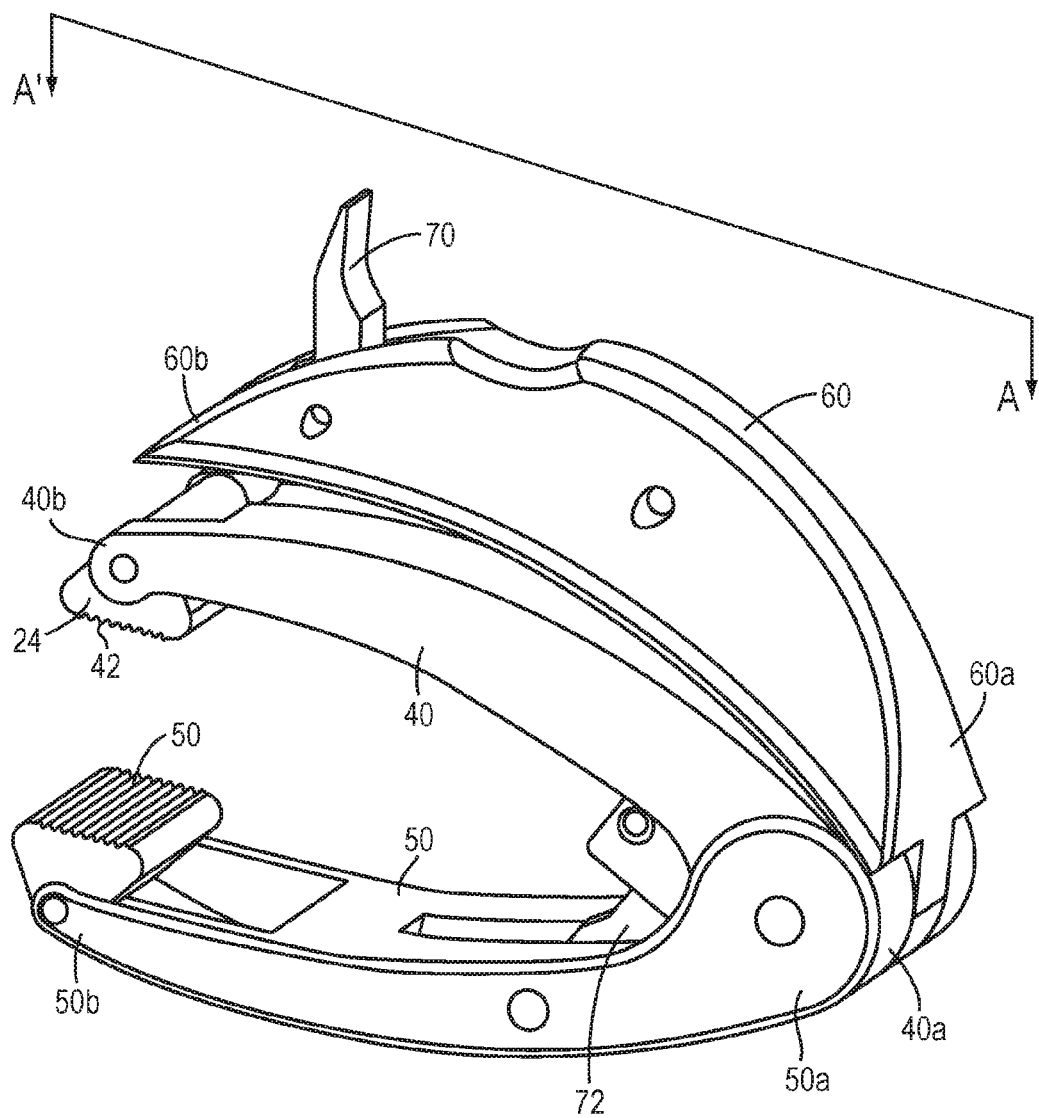
FIG. 1(C) is a perspective rear oblique view of one embodiment of the present invention in a fully released position.

In this fully released position, (FIG. 1(C)) the release lever 70 is fully raised and the locking handle 60 is separated from the first jaw 40. In one embodiment, the clamping system also includes an adjustment element 72 (described below) which adjusts the distance between the first jaw 40 and second jaw 50, at which the clamping system locks so that items of various thicknesses can be secured by the clamping system.

Figure 2A:
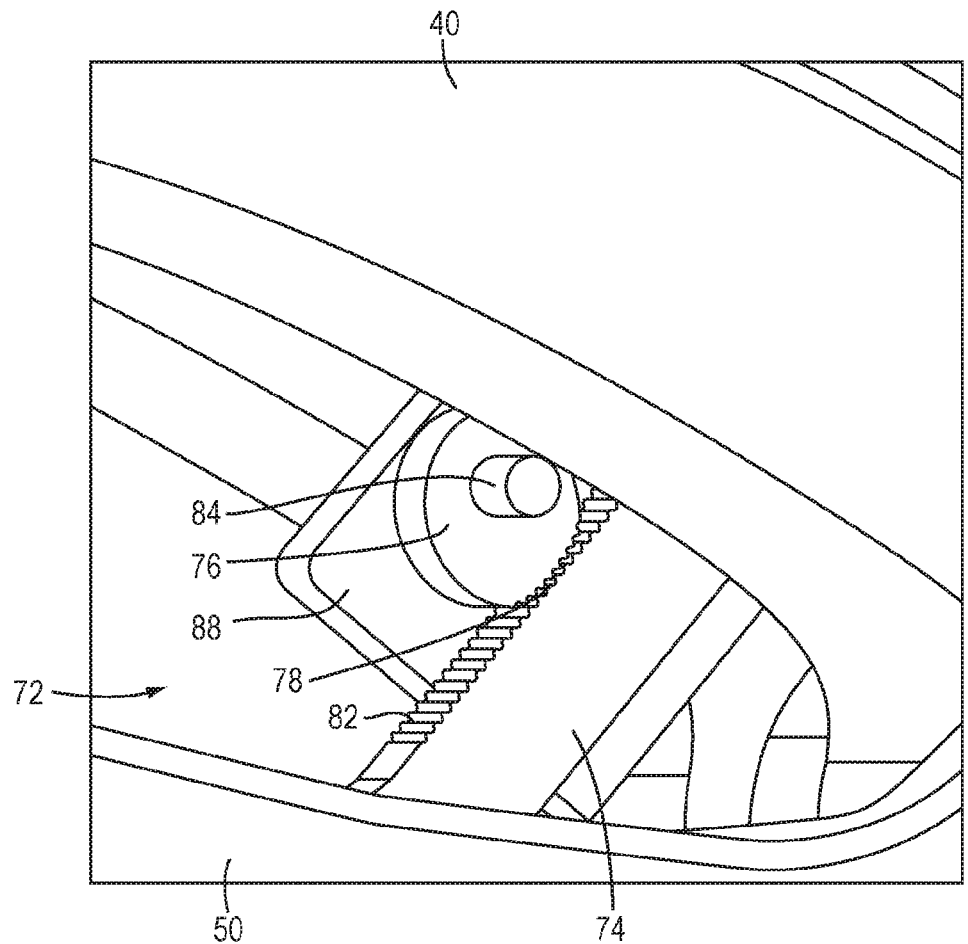
FIG. 2(A) is a perspective view of an embodiment of an adjustment mechanism of the present invention.
Figure 3A:
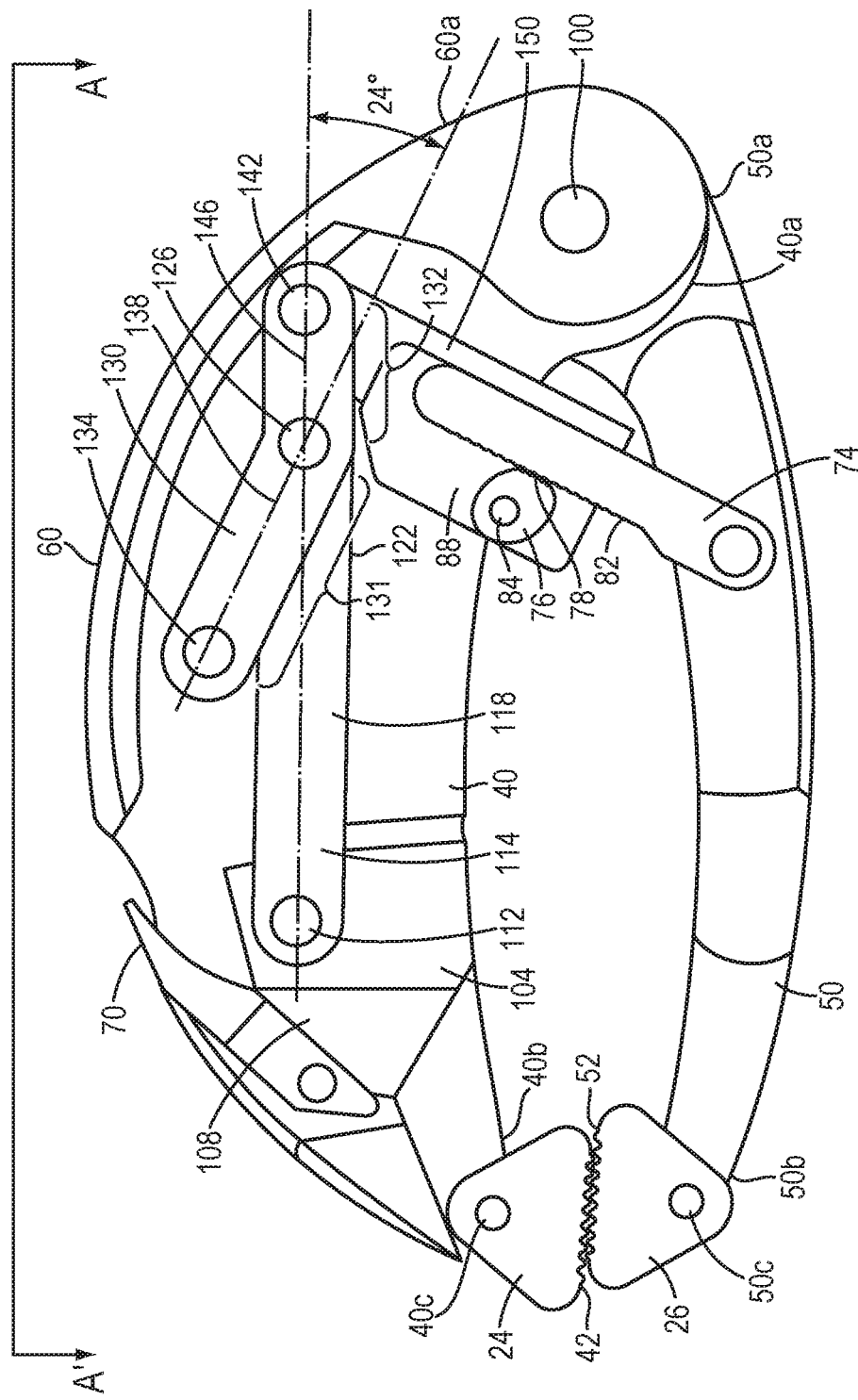
FIG. 3(A) is a longitudinal cross-sectional view of A-A' of FIG. 1(A) in the closed position.

Referring to FIG. 2(A), in one embodiment, the adjustment element 72 includes a locking bar 74 and a eccentrically mounted rotatable cam 76. In one embodiment the locking bar 74 is serrated and the eccentrically mounted rotatable cam 76 has a partially serrated edge 78 configured to releasably engage with the serrated edge 82 of the locking bar 74, as shown in FIG. 3(A). The eccentrically mounted rotatable cam 76 is mounted on an adjustment pivot 84 fixedly attached to a mounting plate 88. In one embodiment, mounting plate 88 includes extension 150 (FIG. 3A) which is configured to restrain locking bar 74 such that locking bar 74 is unable to move laterally away from the eccentrically mounted rotatable cam 76.

Figure 2B:
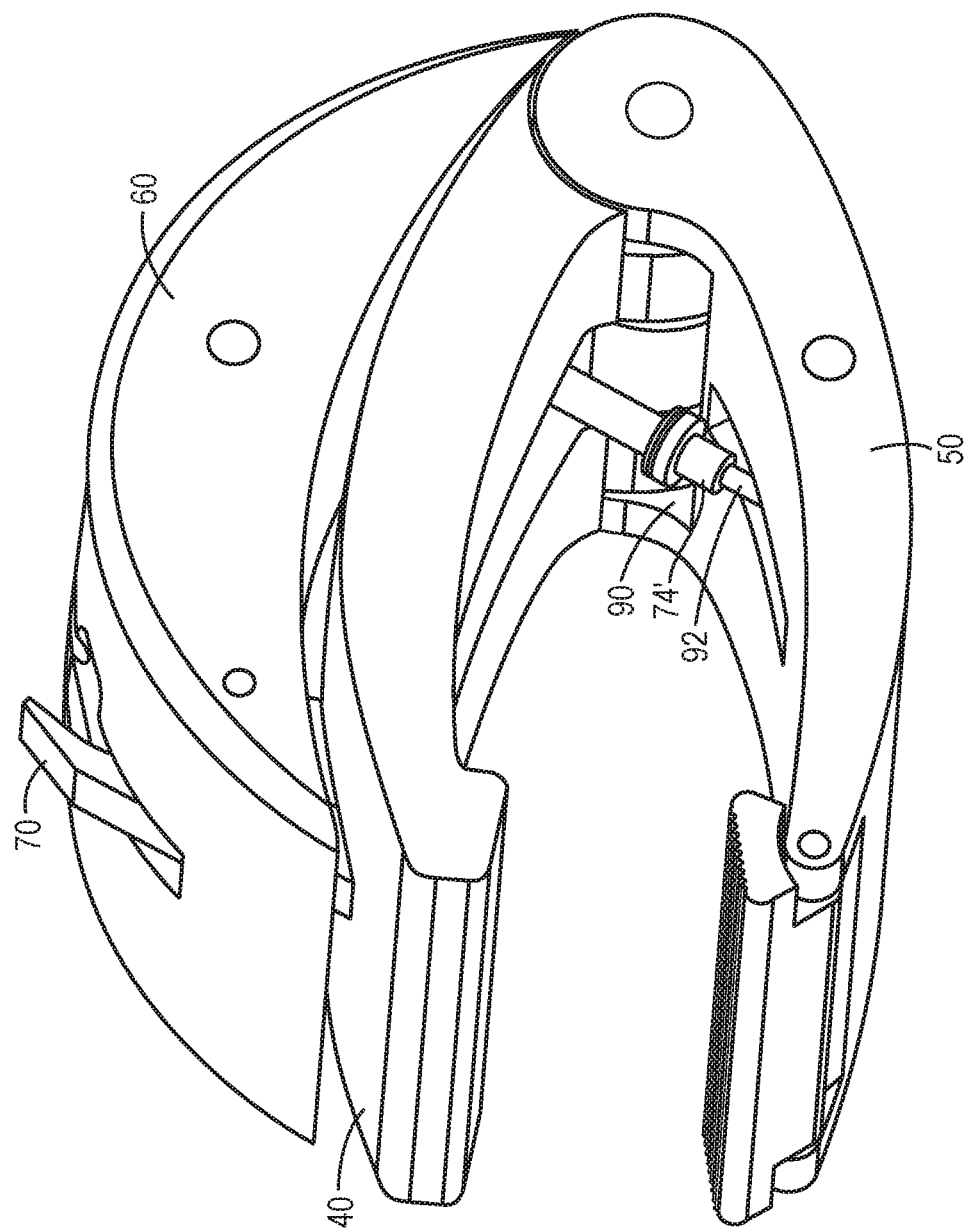
FIG. 2(B) is a front perspective view of the present invention with another embodiment of an adjustment mechanism.

When the locking handle 60 is sufficiently separated from the first jaw 40, the locking bar 74 of the adjustment element 72 disengages from the eccentrically mounted rotatable cam 76, allowing the first jaw 40 and second jaw 50 to move apart. In a further embodiment (FIG. 2(B)), the adjustment element 74' includes a locking nut element 90 which, when rotated, moves along a screw thread 92 to adjust the distance between the first jaw 40 and the second jaw 50.

FIG. 3(A) is a cross-section view of an embodiment of the clamping system in closed position showing the mechanical components of the clamping system. The first 40 and second 50 jaws and the locking handle 60 are pivotally connected at a first device pivot 100 which is located at the first ends 40(a), 50(a) and 60(a) of the first jaw 40, the second jaw 50 and the locking handle 60, respectively. In one embodiment, the first end 60(a) of the locking handle 60 is positioned adjacent the first end 40(a) of the first jaw 40, which is in turn positioned adjacent the first end 50(a) of second jaw 50. The three ends 40(a), 50(a) and 60(a) are rotatably held together by a first device pivot 100 to form a hinge.

The first jaw 40 includes a release block 104 that has a slanted surface 108. In one embodiment, the first linear lever arm 114 is rotatably attached to a fixed pivot 112 which in turn is fixedly attached to the release block 104 at one end of the first linear lever arm 114. The lever arm 114 has a longitudinal axis 118. The second end 122 of the first lever arm 114 is attached to a movable pivot 126. A second non-linear lever arm 130 is movably attached to a fixed pivot 134 that is attached to the locking handle 60. One portion 131 of the second non-linear lever arm 130 defines a first linear axis 138 that passes through fixed pivot 134 and movable pivot 126. A second portion 132 of the nonlinear lever arm 130 is attached to a movable pivot 142 and defines a second axis 146 that passes through movable pivot 126 and movable pivot 142. Movable pivot 142 is fixedly attached to extension 150 of mounting plate 88. As pivot 142 moves toward or away from the second jaw 50, the rotatable cam 76 is moved along locking bar 74.

When the first and second jaws 40 and 50, respectively, are adjusted so that the first 24 and second 26 jaw pads are positioned such that their contact surfaces 42 and 52 engage with one another, the longitudinal axis 118 of the first lever arm 114 and the first axis 138 of the second non-linear lever arm 130 intersect in one embodiment at an angle of about 24 degrees. Further, the axis 118 of the first lever arm 114 is substantially co-linear with the second axis 146 of the non-linear lever arm 130.

Figure 3B:
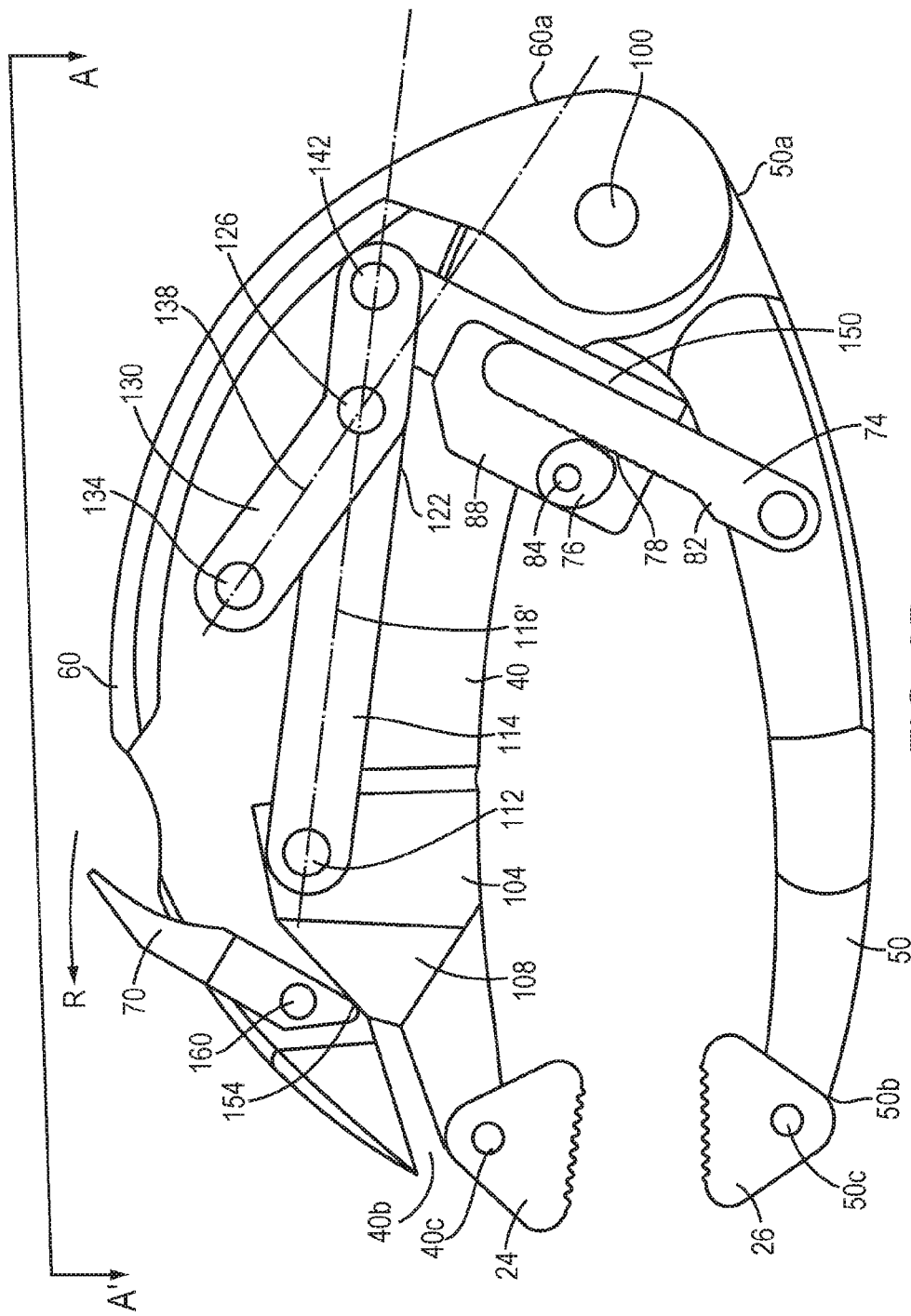
FIG. 3(B) is a longitudinal cross-sectional view along line A-A' of one embodiment of the present invention in the partially released position of FIG. 1(B)

Referring to FIG. 3(B), to open the first and second jaws 40 and 50 respectively, release lever 70 is moved (arrow R) toward the front of the clamp system. The release lever 70 rotates about pivot 160 causing the short arm 154 of lever 70 to exert pressure against slanted surface 108 of release block 104 and thereby begin to separate the locking handle 60 from the first jaw 40. As this occurs, pivot 142, which is constrained by extension 150 remains in position as pivots 112, 126 and 134 rotate away from first jaw 40 at different rates. This causes pivot 142 to drop below axis 118.

Figure 3C:
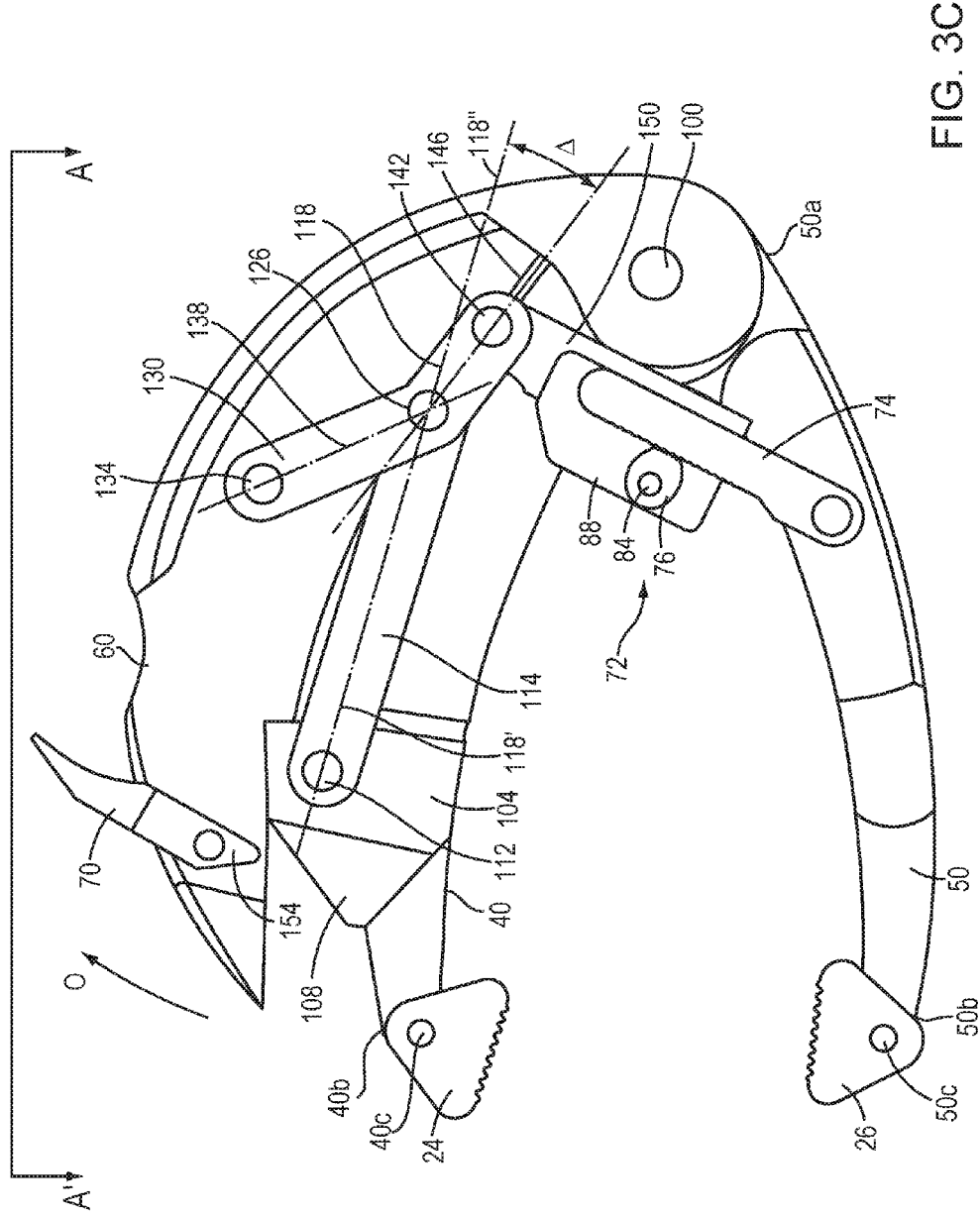
FIG. 3(C) is a longitudinal cross-sectional view along line A-A' of the embodiment of the present invention in the fully released position of FIG. 1(C).

Referring now to FIG. 3(C), as locking handle 60 is moved away (arrow O) from the first jaw 40, pivot 142 is located further and further away from axis 118 and axis 146 forms a larger and larger angle (Δ) with axis 118. This allows the first and second jaws 40, 50, respectively, to separate further.

To clamp an object the steps shown in FIGS. 3(A), 3(B) and 3(C) are reversed. The object is placed between the jaw pads 24 and 26 and the cam 76 is moved to engage the locking bar 74 to bring the jaw pads 24 and 26 into contact with the surface of the object to be gripped. Next the locking handle 60 is moved toward the first jaw 40 (FIG. 3(C)). This is equivalent to moving pivot 142 toward axis 118 (FIG. 3(B)). Once pivot 142 is located at or above axis 118 (FIG. 3(A)) a locking force is transmitted along the axis 118 locking the jaws 40, 50 in place and forcing the short arm 154 of release lever 70 against the slanted surface 108.

Figure 4:
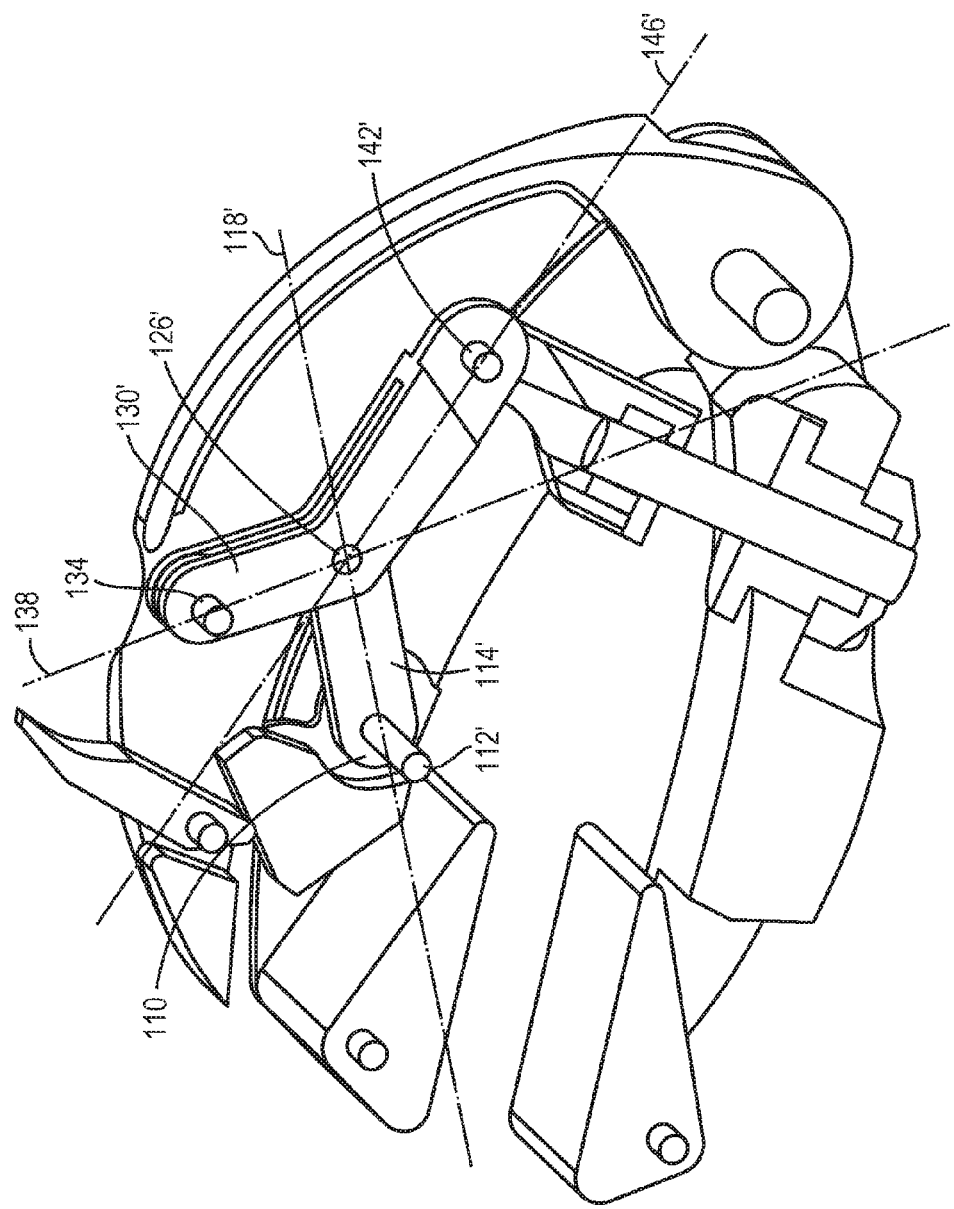
FIG. 4 is a longitudinal cross-sectional view along line A-A' of FIG. 1(A) showing an alternate embodiment of the first and second lever arms.

In another embodiment, (FIG. 4) the first lever arm is also non-linear. In this embodiment, the first non-linear lever arm 114' is movably attached to a fixed pivot 112' at one end 110 and is attached to a movable pivot 126' at a point between the first and second ends of the non-linear first lever arm 114'. The operation of this embodiment is similar to the operation of the embodiment illustrated in FIGS. 3(A)-3(B). As with the previous embodiment, a longitudinal axis 118' is defined between pivot 112' and pivot 126', and longitudinal axis 146' is defined between pivot 126' and pivot 142'. The clamp is considered to be in a locked position when pivot 126' is positioned so that axis 118' is below pivot 142'. The clamp is considered to be in an open position when pivot 126' is positioned so that axis 118' is above pivot 142'.

Figure 5A:
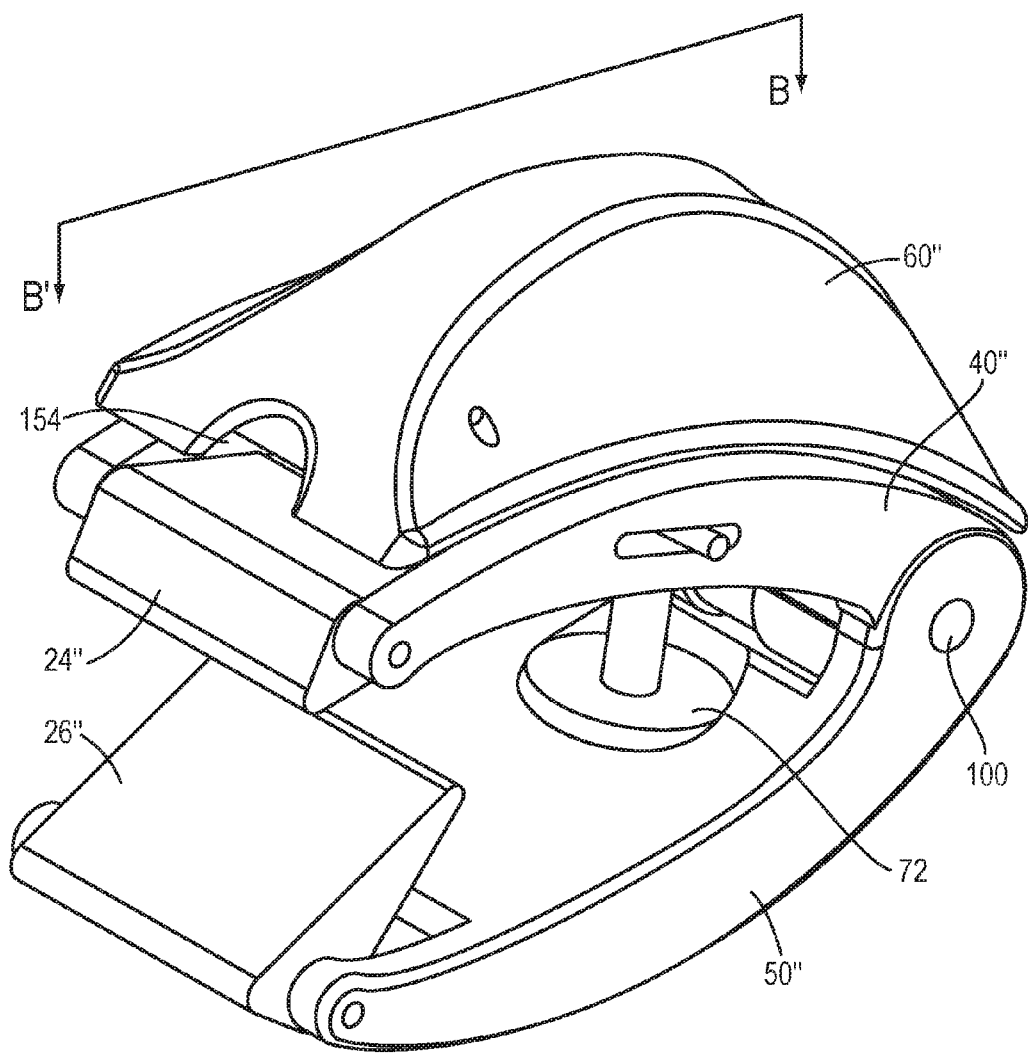
FIG. 5(A) is a perspective front oblique view of another embodiment of the invention in the open position.
Figure 5B:
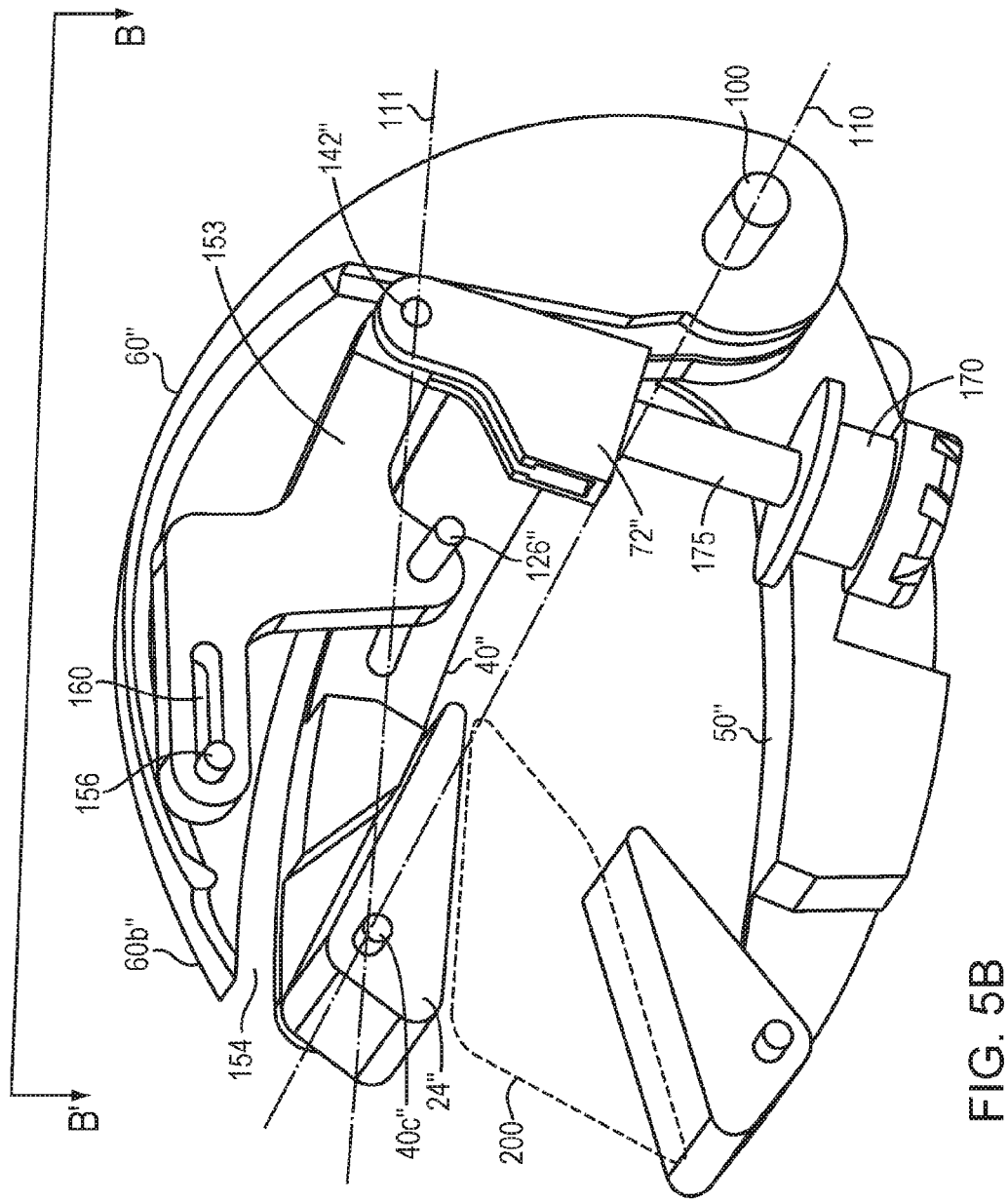
FIG. 5(B) is a longitudinal cross-sectional view along line B-B' of FIG. 5(A) of the embodiment of the present invention showing the non-geometric member with three portions.

Another embodiment is illustrated in FIGS. 5(A)-5(B). In this embodiment (FIG. 5(B)), there is no release lever 70 and the multiple lever arms have been replaced with a single lever arm 153 having three pivot points (156, 126", 142") (FIG. 5(B)). The pivot points operate under the same principles as those of the other embodiments. FIG. 5(B) shows the clamp in locked position and adjusted such that an object 200 is placed between first jaw 40" and second jaw 50". When the clamp is in a locked position, pivot 126" is located below a first longitudinal axis 111 that runs between pivot 40(c)" on first jaw pad 24" and pivot 142" on adjustment element 72. When the clamping system is locked, any upward pressure applied by the object being clamped would attempt to move pivot 40(c)" as well as pivot 126" clockwise about pivot 100. However, the distance between pivot 126" and pivot 142" is fixed by non-geometric member 153. Rod 156 cannot move laterally any further towards the second end 60(b)" of the locking handle 60", thus no movement of first jaw 40" can occur.

The clamp is released or opened by pulling upward on handle 60". There is a gap 154 (FIG. 5(A)) between top jaw 40" and front end 60(b)" of handle 60" that allows a user to insert one or more fingers to apply an upward force on handle 60". The upward movement of handle 60" causes pivot 156 to immediately move upward thereby also causing pivot 126" to move in a generally upward direction. When pivot 126" moves above longitudinal axis 111, the pressure holding the clamp in the closed position is released and the two jaw portions move freely.

Closing the clamp is achieved by reversing the movement of the various elements. For example, as handle 60" is pressed down toward the jaw portions, the downward movement of handle 60" causes pivot 156 to move downward thereby causing pivot 126" to approach and pass through longitudinal axis 111. With pivot 126 located below longitudinal axis 111, the clamp is locked.

This embodiment includes at least two rods serving as pivot points positioned within respective slots. Because the multiple lever arms of the previous embodiments have been replaced by a single lever arm, the movement of each pivot point is somewhat limited. Thus, to allow the top jaw 40" and bottom jaw 50" as well as handle 60" to achieve a reasonable amount of movement, slots are used to allow the pivot points to have more movement. Accordingly, an upward movement of pivot 156 also involves a lateral movement of pivot 156 backward along slot 160 toward the proximal end 60(b)" of the clamp. Similarly, pivot 126" comprises a rod located in a slot (not labeled) formed in top jaw 40". An upward movement of pivot 126" also involves a lateral movement of pivot 126" toward the distal end 60(b)" of the clamp.

This embodiment includes an adjustment element 72". Adjustment element 72" can be any number of devices that adjusts the distance between pivot 142" and second jaw 50". In this embodiment, adjust element 72" comprises a nut-and-bolt-type mechanism in which a nut, located in second jaw 50", is connected to a bolt by way of a threaded connection. Rotation of nut 170 adjusts the length of bolt 175, which in turn adjusts the distance between pivot 142" and second jaw 50". Adjusting the distance between pivot 142" and second jaw 50" in turn adjusts the angle between longitudinal axis 111 and axis 110 which extends from pivot 40(c)" and pivot 100.

Figure 6A:
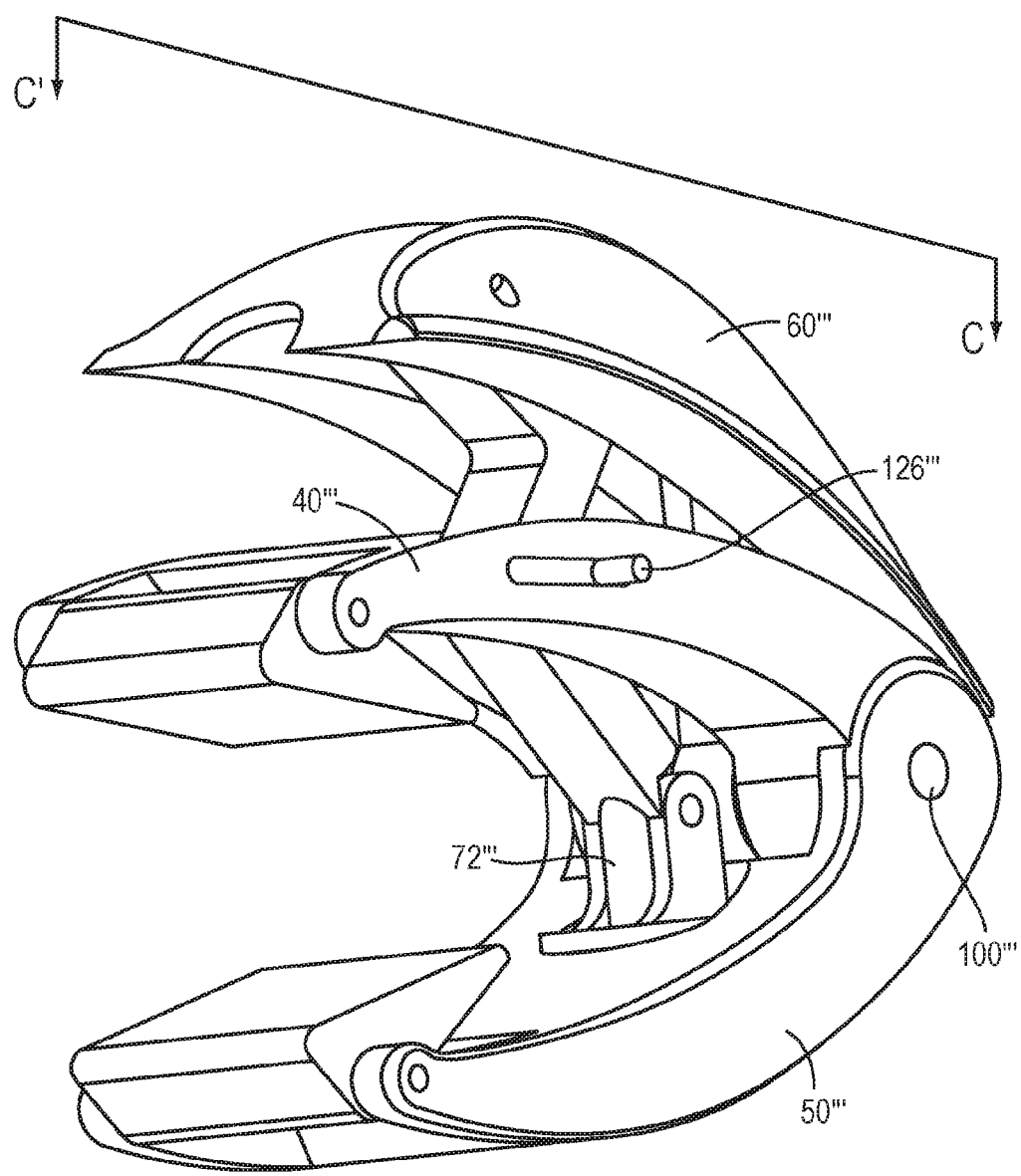
FIG. 6(A) is a perspective front view of another embodiment in an open position.
Figure 6C:
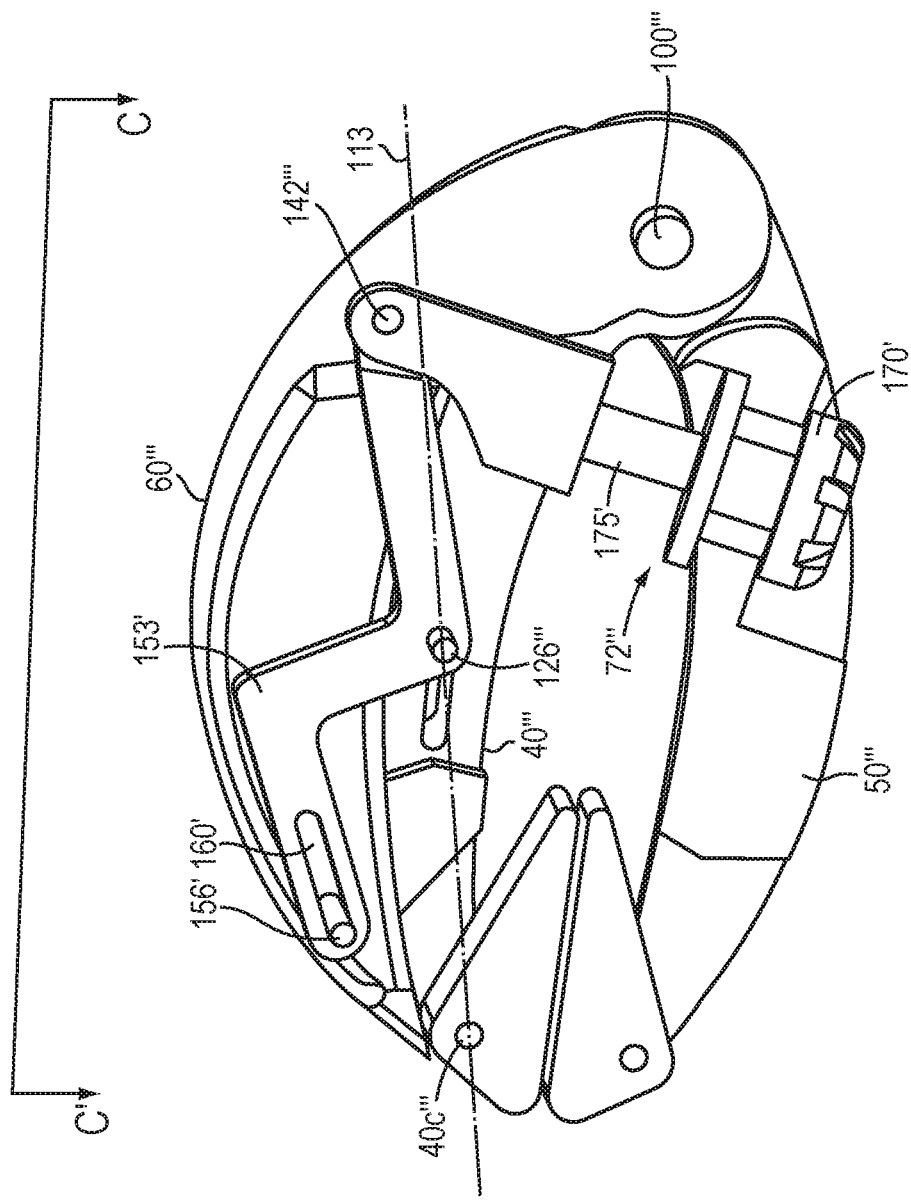
FIG. 6(C) is a longitudinal cross-sectional view taken along line C-C' of FIG. 6(A) illustrating the clamp in a closed configuration

Another embodiment is illustrated in FIGS. 6(A)-6(C). As in the previous embodiment, the multiple lever arms have been replaced with a single lever arm 152' (FIG. 6(B)) having three pivot points (156', 126''', 142'''). The pivot points operate under the same principles as those of the other embodiments but are described in a slightly different manner in this embodiment. For example, when the clamp is in a locked position, pivot 142''' is located above a longitudinal axis 113 that runs between pivot 40(c)''' on top jaw 40''' and pivot 126'''.

The clamp is considered to be in an open position when pivot 142''' is located below longitudinal axis 113. From the locked position, the clamp is released or opened by pulling upward on handle 60'''. The upward movement of handle 60''' causes pivot 156' to immediately move upward thereby also causing pivot 126''' to move in a generally upward direction. The upward movement of 126''' causes longitudinal axis 113 to move above pivot 142'''. FIG. 6(B) illustrates the open configuration.

To lock or close the clamp, a downward force is applied to handle 60''', which moves top jaw 40''' downward until it cannot move further at which point further downward movement of handle 60''' causes pivot 126''' to move below longitudinal axis 113 and to move below pivot 142'''. FIG. 6(C) illustrates the closed configuration.

This embodiment includes at least two rods serving as pivot points positioned within respective slots. Because the multiple lever arms of the previous embodiments have been replaced by a single lever arm, the movement of each pivot point is somewhat limited. Thus, to allow the top jaw 40''' and bottom jaw 50''' as well as handle 60''' to achieve a reasonable amount of movement, slots are used to allow the pivot points to have more movement. Accordingly, an upward movement of pivot 156' also involves a lateral movement of pivot 156' forward along slot 160' toward the front end 60(b)''' of the clamp. Similarly, pivot 126''' comprises a rod located in a slot (FIG. 6(A)) formed in top jaw 40'''. An upward movement of pivot 126''' involves a lateral movement of pivot 126''' toward the distal end 60(b)''' of the clamp. However, the movement of pivot 126''' and pivot 156' within their respective slots—whether forward or backward—will depend on the relative positioning of pivots 142''' and 100'''. For example, in FIG. 6C where there is more distance between pivots 142''' and 100''', the movement of pivots 126''' and 156''' is reversed.

This embodiment includes an adjustment element 72'''. Adjustment element 72''' can be any number of devices that adjusts the distance between pivot 142''' and second jaw 50'''. In this embodiment, adjustment element 72''' comprises a nut-and-bolt-type mechanism in which a nut located in second jaw 50''' is connected to a bolt by way of a threaded connection. Rotation of nut 170' adjusts the length of bolt 175', which in turn adjusts the distance between pivot 142''' and second jaw 50'''. Adjusting the distance between pivot 142''' and second jaw 50''' in turn has an affect on the point at where which longitudinal axis 113 is either above or below pivot 142'''.

FIGS. 7A-7DD illustrate an additional embodiment according to the present disclosure that represents a rearrangement of the various components of the previously described embodiments but where the function of each component and the manner in which each component interacts with other components remains relatively unchanged.

Figure 7A:
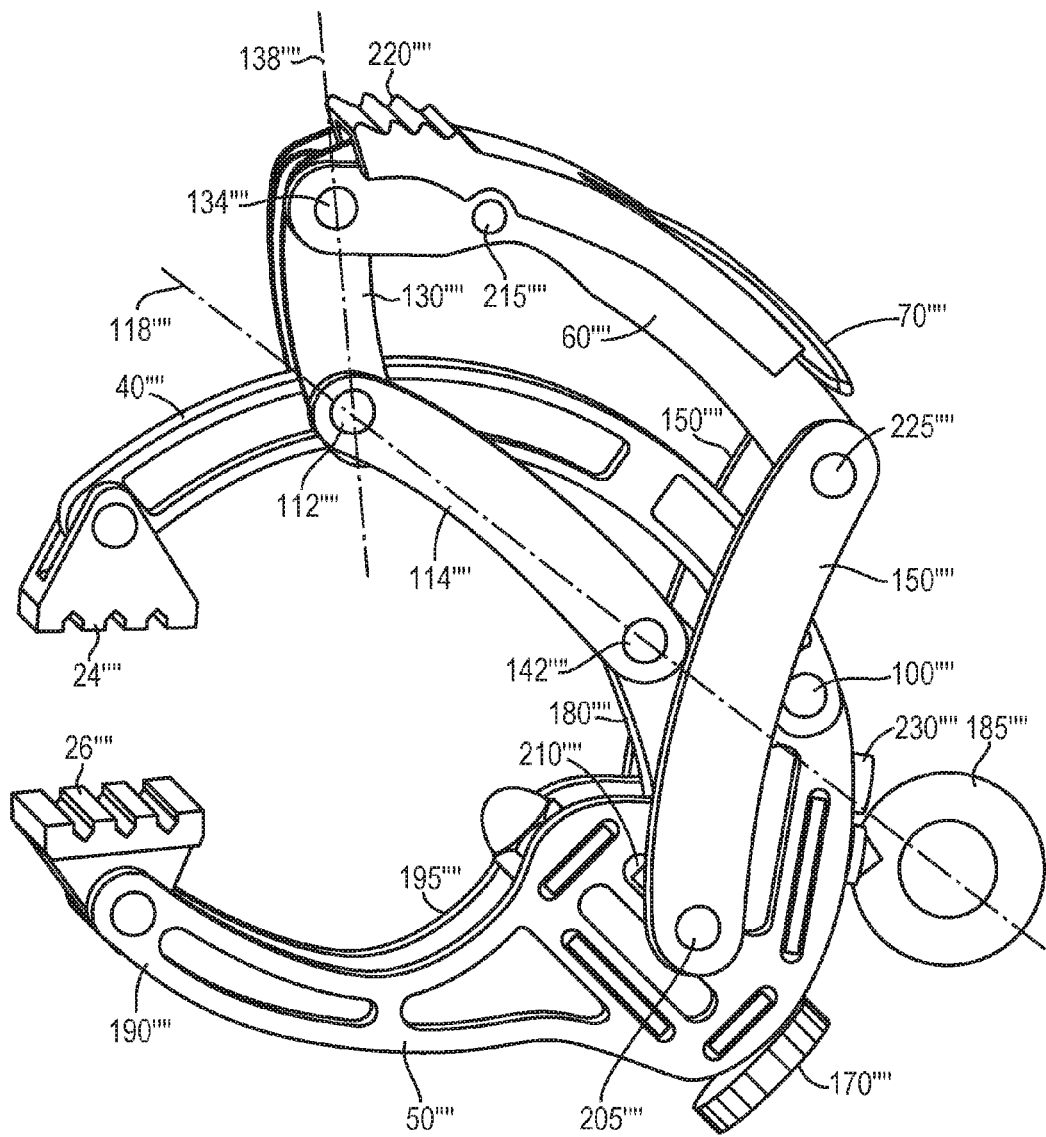
FIG. 7A is a side view of another embodiment in an open position.
Figure 7A:
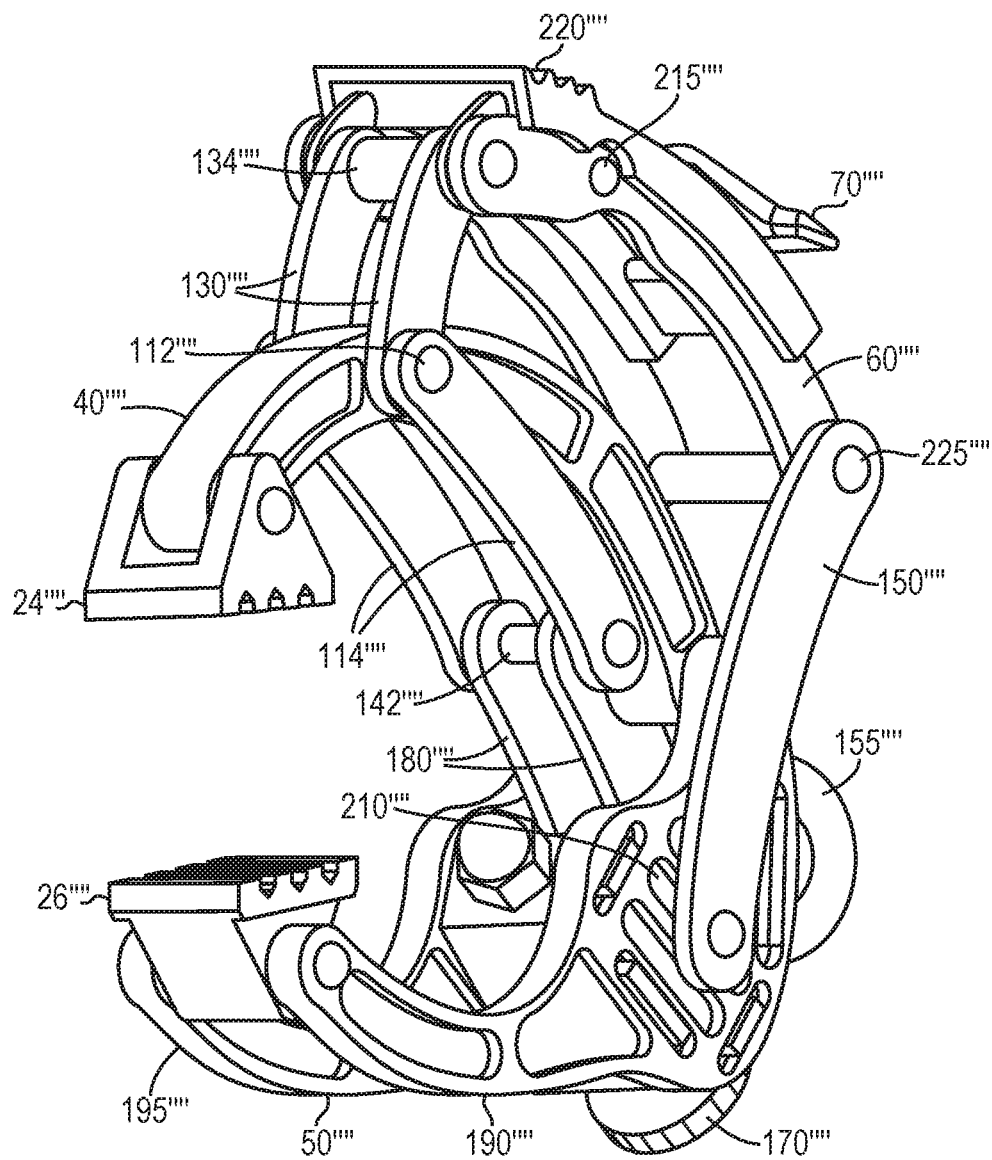

The clamping system of FIG. 7A includes bottom jaw 50'''' and top jaw 40'''' where the two jaws are rotatably, or pivotally, connected at first pivot 100'''' and each jaw includes rotatable pads 24'''' and 26'''' that are configured to clamp down on an object. As can be seen in the figures, some of the components comprise parallel pieces secured to each other with a bolt or rivet or other suitable connection. For example, bottom jaw 50'''' comprises first plate 190'''' and second plate 195'''' that are secured together at a number of positions along bottom jaw 50'''', such as at the pivoting connection between pad 26'''' and, first pivot 100''''. Additional connection points include the pivoting connection point 205'''' with extension 150'''', which itself is shown as comprising a front portion and a back portion that are secured to each other by means of a bolt or rivet or other suitable connection toward the top end 225'''' of extension 150'''' and the other toward the bottom end 205'''' of extension 150''''. The bottom portion of extension 150'''' is rotatably connected to bottom jaw 50'''', and the top portion of extension 150''''—which extends above bottom jaw 40''''—is rotatably connected at pivot 225'''' to the proximal portion, or first end, of handle 60''''. Handle 60'''' includes release lever 70''''. The distal portion, or second end, of handle 60'''' is rotatably connected at pivot 134'''' to second lever arm 130'''' at one end of the lever arm where the other end of lever arm 130'''' is rotatably connected at pivot 112'''' to top jaw 40''''. In this embodiment, pivot 112'''' also serves a rotatable point of connection between top jaw 40'''' and lever arm 114'''' with the other end of lever arm 114'''' rotatably connected at pivot 142'''' to lever arm 180''''. Although not shown in this figure, the other end of lever arm 180'''' is connected to adjustment element 170'''', which itself is secured to bottom jaw 50'''' between top plate 190'''' and bottom plate 195''''. Also secured to bottom jaw 50'''' is an optional loop 185''''. In this embodiment, loop 185'''' is shown located at the proximal end of the clamp system above adjustment element 170"". In some embodiments, loop 185"" is positioned below adjustment element 170"" and/or at a position closer to the distal end of bottom jaw 50"".

Figure 7B:
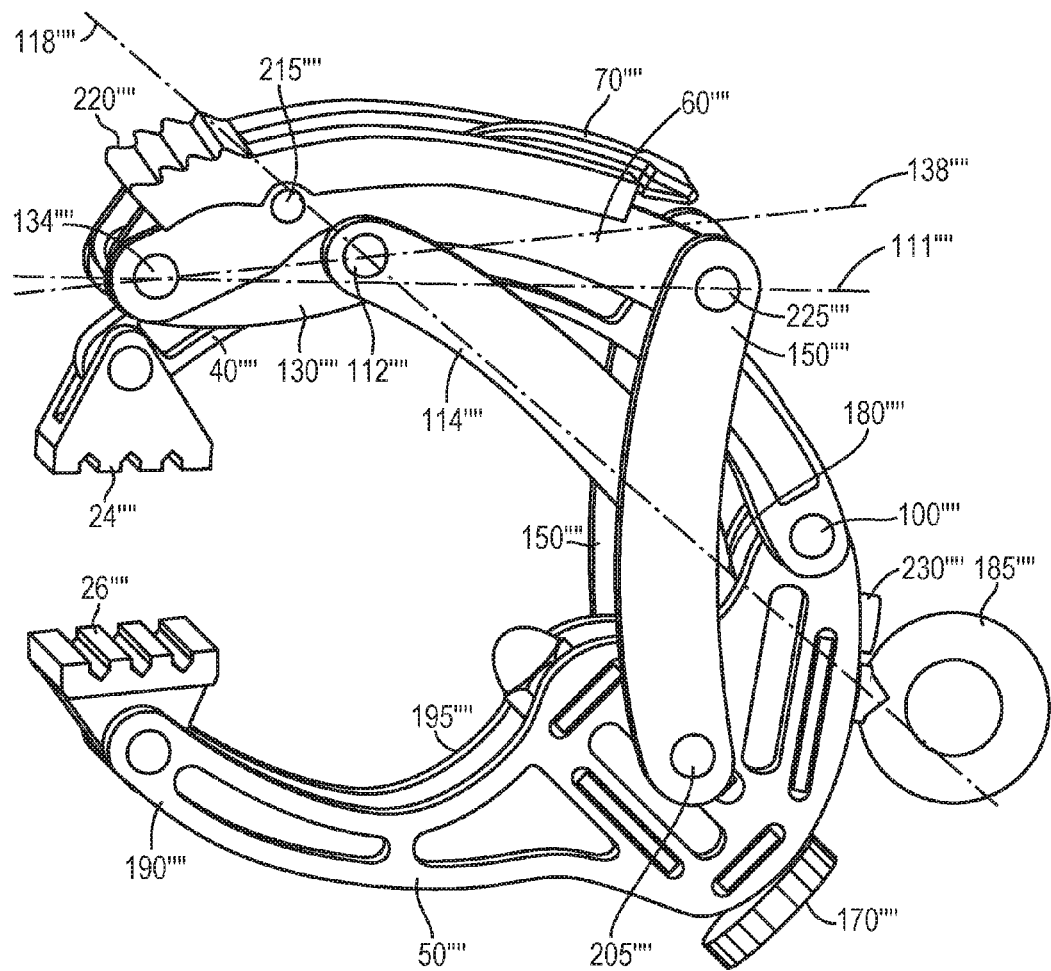
FIG. 7B is a side view of the embodiment of FIG. 7A in a closed, or locked, position.
Figure 7B:
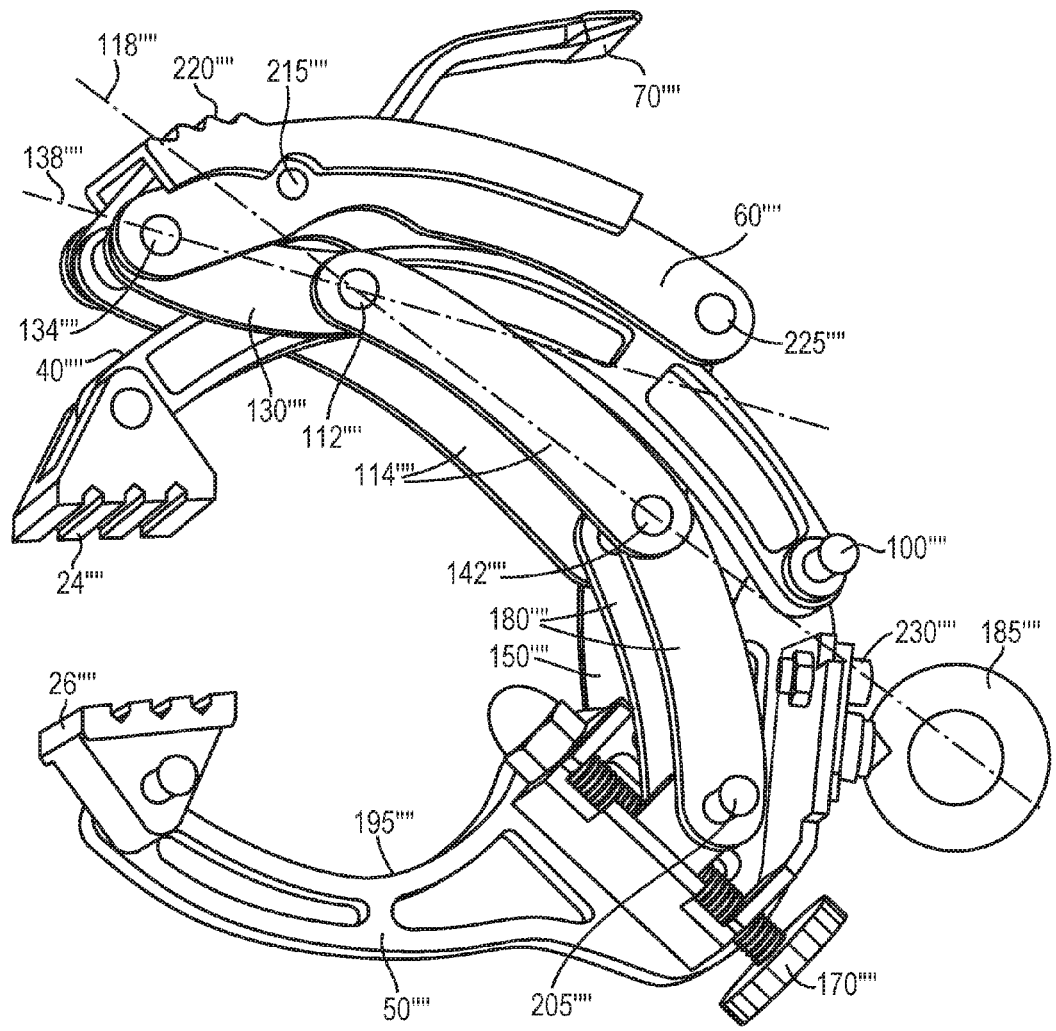

Loop 185"" can serve any number of purposes such as allowing the clamping system to be secured to a rope, which in turn could be connected to a weight. In some cases, it may be desirable to secure the rope to another object, which may a fixed objection such that the clamp and whatever it is clamping hangs from the fixed object. In some embodiments, loop 185"" may be replaced by a different structure or securing mechanism, such as a base for a pole (e.g., a flag pole), a hook, a clamp, a camera mount, etc. In some embodiments, the clamping system is configured to allow for multiple, interchangeable attachments. Loop 185"" is shown as being secured to the clamping system using hex bolt 230"". FIG. 7BB illustrates how hex bolt 230"" secures loop 185 to the clamping system. It is understood, however, that any number of different mechanisms and designs could be used in lieu of or in addition to hex bolt 230"".

Release lever 70"" is pivotably secured to handle 60"" at pivot 215"", which in this embodiment is positioned between pivot 134"" and pivot 225"". In some embodiments, lever 70"" is pivotably secured to handle 60 at pivot 134"". When the first end or free end of release lever 70"" is pulled upward or away from the clamping system, pivot 215"" causes the second or opposite end of release lever 70"" to apply a downward force on top jaw 40"", thereby causing the second end of handle 60"" to move upward.

Handle 60"" includes a grip portion 220"" secured to the top of handle 60"". Grip portion 220"" may be made of any number of materials including a rubber, a plastic, a thermoplastic, etc. In some embodiments, grip portion 220"" is formed of a pliable material that provides a good griping surface to facilitate use of the clamping system. In this embodiment, grip portion 220"" includes a channel or open slot through which release lever 70"" extends.

The various pivots illustrated in this embodiment may comprise a bolt or other cylindrical securing device. In this embodiment, the pivots comprise bolts that extend from one side of the clamping system to the other side of the clamping system. This means that pivot 112"" is fixed relative to the clamping system because the bolt extends through a hole in top jaw 40"". Similarly pivot 100"" is fixed relative to the clamping system. However, pivots 134"", 142"", and 205"" are not fixed relative to the clamping system as their position depends on whether the clamping system is in an open or a closed configuration and the position of adjustment element 170"".

FIG. 7A also illustrates that first plate 190"" includes channel 210"". Although not illustrated, a corresponding channel is found in second plate 190"". As explained in greater detail below with respect to FIG. 7DD, channel 201"" accommodates the proximal and distal movement of pivot 205 as it is adjusted by adjustment element 170"".

In some embodiments, pivot 134"" occupies a variable position slot within lever arm 130"". In some embodiments, the variable position slot includes two or more positions that pivot 134"" may occupy, which can affect a number of functional characteristics of the clamping system, such as the closing position of the clamping system.

The embodiment illustrated in FIG. 7A is in an open configuration. In the open configuration, handle 60"" is lifted up from top jaw 40"". To better understand how the illustrated clamping system opens and closes, reference is made to imaginary line 138"", which is defined as a straight line between pivot 134"" and pivot 112"". Reference is also made to imaginary line 118"", which is defined as a straight line between pivot 112"" and pivot 142"". As handle 60"" is lifted up from top jaw 40"", the angle between line 138"" and line 118"" increases. The more handle 60"" is separated from top jaw 40"", the larger the angle between line 138"" and line 118"" becomes.

FIG. 7AA also illustrates the clamping system in an open configuration but with the clamping system rotated about 30 degrees counterclockwise so as better illustrate the spatial relationship between the various components of the clamping system. This illustration also highlights the paired nature of the various lever arms, namely that each lever arm comprises a pair of lever arms. In some embodiments, this paired arrangement adds strength to the overall clamping system and may allow for the use of less rigid materials or lighter materials or less material. FIG. 7AA also illustrates the nature of the various pivot points, which in this embodiment extend through the clamping system from the first side to the second side.

FIG. 7B illustrates the clamping system in a closed configuration. To close the clamping system, a downward force is applied to handle 60"" causing it to move toward top handle 40"". This downward movement also causes the angle between line 138"" and 118"" to decrease until the two lines are parallel. Further downward movement causes the two lines to pass through each other such that the angle in the open configuration can be described as a positive angle whereas the angle in the closed configuration can be described as a negative angle. FIG. 7B also illustrates the changes in position of the various pivots. Another way to describe how the clamping system is closed or locked is to determine the relative position of pivot 112"". It can be seen that pivot 112"" can be described as being above imaginary line 111"", where line 111"" is defined as a straight line between pivot 134"" and pivot 142"". Although line 111"" is not shown in FIG. 7A, it can be seen that pivot 112"" would be positioned below line 111"" when the clamping system is in the open configuration.

FIG. 7BB also illustrates the clamping system in a closed configuration but with the top portion of the clamping system slightly rotated away from the viewer so as better illustrate the spatial relationship between the various components of the clamping system. In this illustration, first plate 190"" and one of the two parts that comprise lever arm 150"" have been removed. This allows the relationship between lever arm 180"" and lever arm 114"" to be better seen as well as pivot 205"" that secures lever arm 150"" to adjustment element 170"". The various components of adjustment element 170"" are described below in relation to FIGS. 7D and 7DD. With first plate 190"" removed, it can be seen that adjustment element 170"" is secured between first plate 190"" and second plate 195"". It can also be seen that loop 185"" in this embodiment is secured between first plate 190"" and second plate 195"".

Figure 7C:
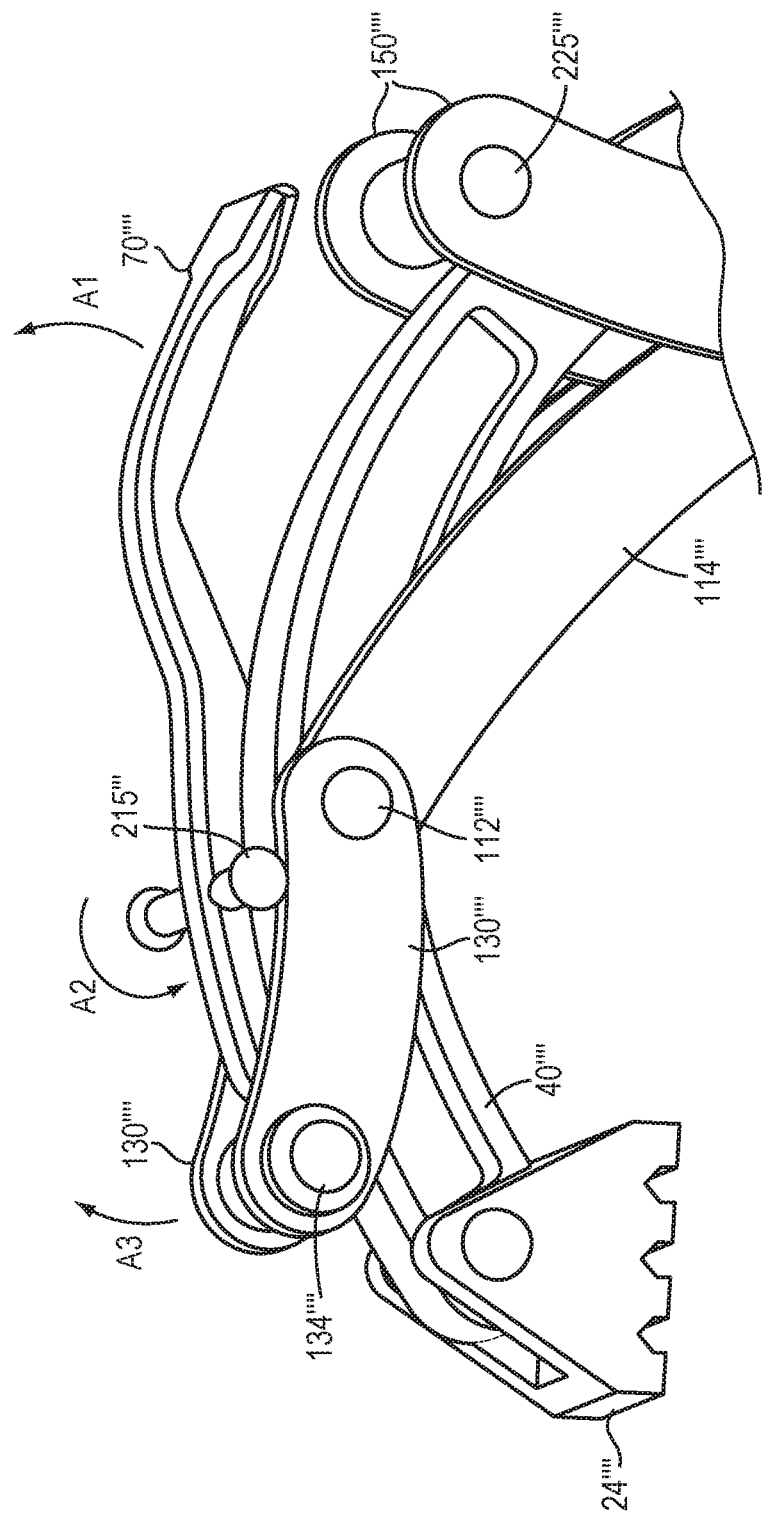
FIG. 7C is an enlarged and partially disassembled view of a portion of the embodiment illustrated in FIG. 7A.

FIG. 7C illustrates how the clamping system is opened. In this illustration, handle 60"" has been removed to better illustrate the function of release lever 70"", which is rotatably connected to handle 60"" at pivot 215"", though release lever 70"" could alternatively be connected to handle 60"" at pivot 134"" or any other suitable pivot point. A portion of release lever 70"" extends beyond pivot 2154"". When an upward force is applied to the proximal portion of release lever 70"" (shown with arrow A1), release lever 70"" pivots about pivot 215"" causing the distal portion of release lever 70"" to apply a corresponding downward force (shown with arrow A2) on top jaw 40"". This causes pivot 134"" to move upward (shown with arrow A3), thereby affecting the angle of lines 138"" and 118"" or the position of pivot 112"" relative to line 111"".

Release lever 70"" is shown in FIG. 7C as having a curved shape with one end extending slightly above handle 60"" and the other end shaped to substantially conform to the shape of top jaw 40"" when the clamping system is in a closed configuration. However, release lever 70"" could be shaped have a substantially different shape and still accomplish the same goals as in the presently illustrated embodiment.

Figure 7D:
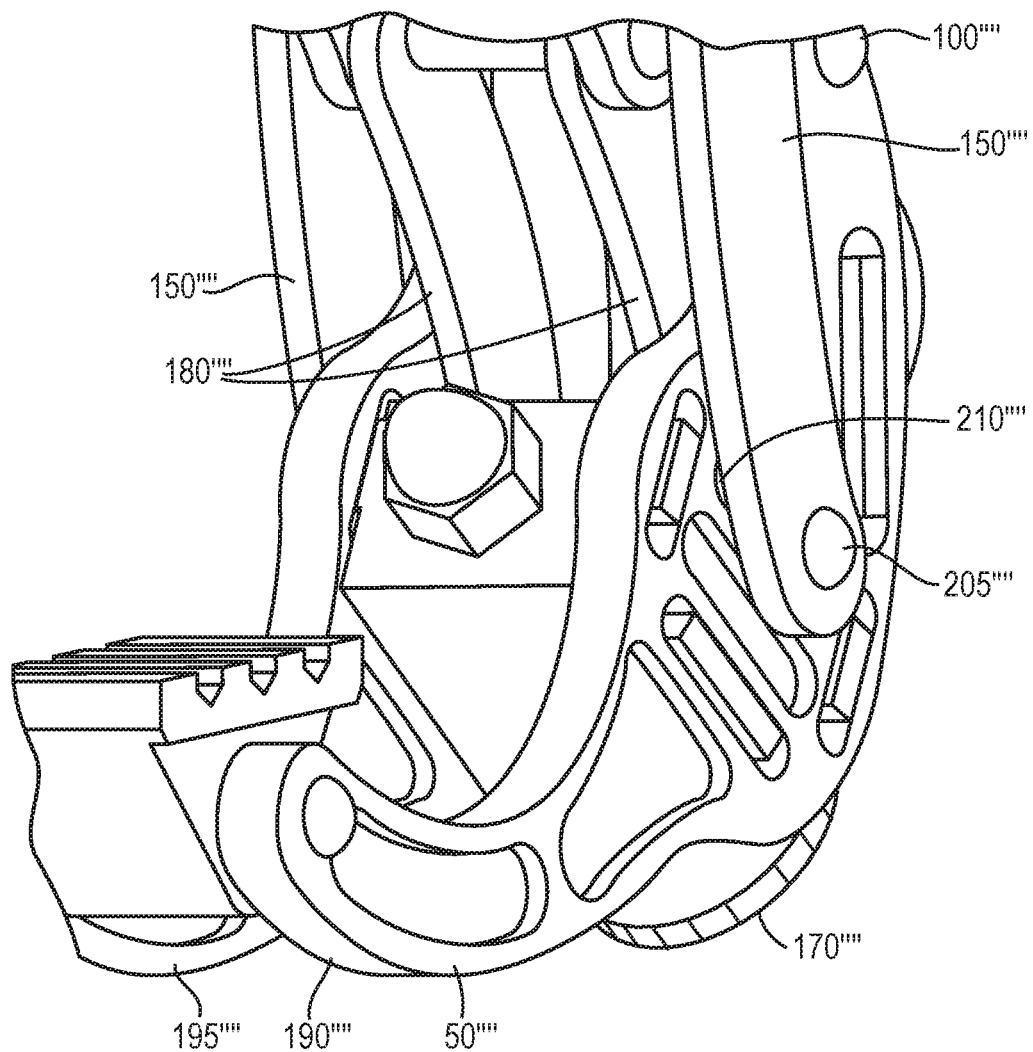
FIG. 7D is an enlarged, angled view of the embodiment illustrated in FIG. 7A highlighting an adjustment element.
Figure 7D:
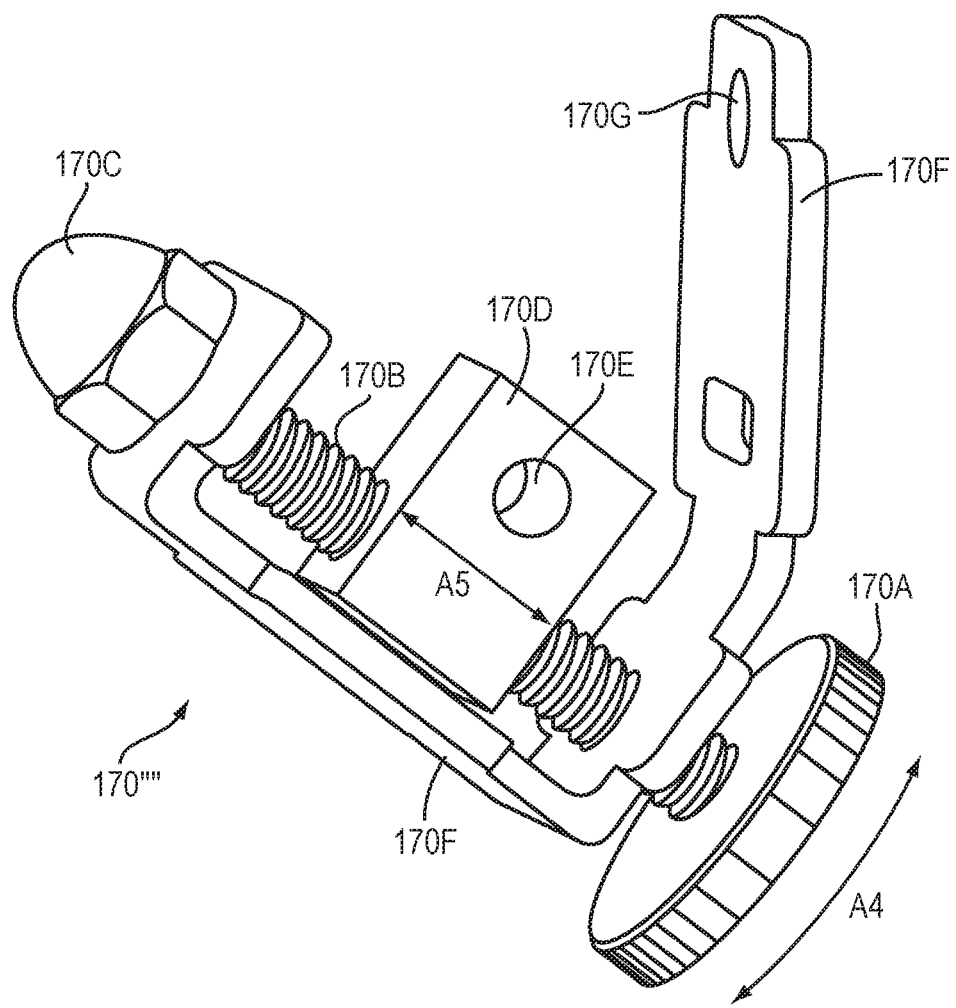

FIG. 7D is an enlarged view of adjustment element 170"" positioned between first and second plates 190"" and 195"" of bottom jaw 50"". The clamping system in this view is rotated slightly to bring the distal portion of the clamping system closer to the viewer. This allows the various lever arms to be seen as sandwiched between each other or in a layered arrangement with the two components comprising lever arm 150"" positioned outside first and second plates 190"" and 195"" of bottom jaw 50"" and with the two components comprising lever arm 180"" positioned inside first and second plates 190"" and 195"" of bottom jaw 50"". In this embodiment pivot 205"" comprises a bolt or rivet that extends from one side of the clamping system to the other thereby providing a connection between both components of lever arm 150"", both components of lever arm 180"", and adjustment element 170"". Although pivot 205"" also extends through first and second plates 190"" and 195"", it resides in groove 210"", which allows it to slide distally and proximally with the movement of adjustment element 170"".

FIG. 7DD illustrates how adjustment element 170"" functions to adjust the distance between pads 24"" and 26"" of the clamping system in the closed and open configurations. In this illustration, both first and second plates 190"" and 195"" of bottom jaw 50"" have been removed. It can be seen that adjustment element 170"" comprises turning knob 170A positioned on the proximal end of threaded bolt 170B, which includes nut 170C positioned on the distal end. Positioned between the distal and proximal ends of threaded bolt 170B is block 170D. Rotation of threaded bolt 170B by way of turning knob 170A (shown with arrow A4) causes block 170D to move either proximally or distally depending on the direction of rotation. Although not illustrated here, block 170D is secured to one end of lever arms 150"" and 180"" by way of pivot 205"" such that movement of block 170D causes these lever arms to adjust their respective positions, thereby adjusting the position of top jaw 40"" relative to bottom jaw 50"" so as either increase or decrease the distance between pads 24"" and 26"". Pivot 205"" may comprise a bolt or rivet secured to block 170D by way of bore hole 170E. The various components of adjustment element 170"" are supported by bracket 170F, which also secures the components between first and second plates 190"" and 195"" of bottom jaw 50"".

Bracket 170F comprises two portions: the lower portion that supports the functionality of adjustment element 170"" and the upper portion that serves as a base plate or connection means for loop 185"". The upper portion extends from the lower portion. The upper portion may be configured to allow for the attachment of any number of devices or mechanisms as previously discussed. Examples include, hooks, flag pole mounts, camera mounts, clamps, etc. Bracket 170F also includes through hole 170G, which in this embodiment works with hex bolt 230"" (or any other suitable connection configuration) to secure loop 185"". FIG. 7BB illustrates that a threaded nut is used in conjunction with hex bolt 230"". In some embodiments, the threaded nut is permanently secured to bracket 170F or forms an integral part of bracket 170F.

One or more of the components of the various clamping systems disclosed herein may comprise any number of materials, including metals (such as steel, stainless steel, titanium, aluminum, etc.), plastics (such as thermoplastics, acrylic-based plastics, soft plastics, pliable plastics, etc.), rubbers (natural or synthetic). In some embodiments, most of the components comprise stainless steel while some components, such as gripping portions, comprise one or more plastics to improve handling and performance.

Unless otherwise indicated, all numbers expressing lengths, widths, depths, or other dimensions, and so forth used in the specification and claims are to be understood in all instances as indicating both the exact values as shown and as being modified by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The terms "a," "an," "the," and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventor for carrying out the spirit of the present disclosure. Of course, variations on these described embodiments will become apparent to those of ordinary skill in the art upon reading the foregoing description. The inventor expects skilled artisans to employ such variations as appropriate, and the inventor intends for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

The invention claimed is:

1. A clamping system comprising:
a first jaw (40'''') having first and second ends;
a second jaw (50'''') having first and second ends, the second jaw (50'''') being pivotally connected to the first jaw (40'''') at a first pivot (100'''') located at the respective first ends of the first and second jaw (40'''',50'''');
a locking handle (60'''') having first and second ends;
a first lever arm (114'''') having first and second ends;
a second lever arm (130'''') having first and second ends;
a third lever arm (180'''') having first and second ends;
a fourth lever arm (150'''') having first and second ends;
an adjustment element (170'''') secured near the first end of the second jaw (50''''); and
a release lever (70'''');
wherein the second end of the first lever arm (114'''') is pivotally connected to the first jaw (40'''') and the second lever arm (130'''') at a second pivot (112'''');
wherein the second end of the second lever arm (130'''') is pivotally connected to the locking handle (60'''') at a third pivot (134'''');
wherein the first end of the first lever arm (114'''') is connected to the second end of the third lever arm (180'''') at a fourth pivot (142'''');
wherein the first end of the third lever arm (180'''') is pivotally connected to the adjustment element (170'''') and to the first end of the fourth lever arm (150'''') at a fifth pivot (205'''');
wherein the second end of the fourth lever arm (150'''') is pivotally connected to the first end of the locking handle (60'''');
wherein the adjustment element (170'''') is configured to establish a closed configuration between the first jaw (40'''') and the second jaw (50'''');
wherein the release lever (70'''') is pivotally connected to the locking handle (60'''') at a position between the first and second ends of the locking handle (60''''); and
wherein the release lever (70'''') is configured to move the locking handle (60'''') away from the first jaw (40'''') to achieve an open configuration.

2. The clamping system of claim 1, wherein the adjustment element (170'''') comprises a bolt (175'''') that is connected to the first end of the third lever arm (180''''), and wherein rotation of the bolt (175'''') causes the first end of the third lever arm (180'''') to move either toward or away from the first end of the second jaw (50'''').

3. The clamping system of claim 1 further comprising a hook or loop secured to the second jaw (50'''') toward the first end of the second jaw (50'''').

4. The clamping system of claim 1, wherein the first jaw (40'''') comprises a pad (24'''') pivotally connected at the second end of the first jaw (40'''').

5. The clamping system of claim 1, wherein the second jaw (50'''') comprises a pad (26'''') pivotally connected at the second end of the second jaw (50'''').

6. The clamping system of claim 1, wherein the second pivot (112'''') and the third pivot (134'''') define a first imaginary line (138'''') and the second pivot (112'''') and the fourth pivot (142'''') define a second imaginary line (118''''), and wherein first and second imaginary lines (138'''',118'''') define an angle in the open configuration that is greater than 0°.

7. The clamping system of claim 6, wherein first and second imaginary lines (138'''',118'''') define an angle that is less than 0° when the clamping system is in the closed configuration.

8. The clamping system of claim 1, wherein the third pivot (134'''') and the second end (225'''') of the fourth lever arm (150'''') define a third imaginary line (111''''), and wherein the second pivot (112'''') is located below the third imaginary line (111'''') when the clamping system is in the open configuration and above the third imaginary line (111'''') when the clamping system is in the closed configuration.

9. The clamping system of claim 1, wherein second jaw (50'''') comprises a top portion (190'''') and a bottom portion (195''''), wherein the top and bottom portions (190'''', 195'''') define substantially parallel planes.

10. The clamping system of claim 9, wherein the adjustment element (170'''') is positioned between the top and bottom portions (190'''',195'''') of the second jaw (50'''').

11. The clamping system of claim 9, wherein each of the top and bottom portions (190'''',195'''') of second jaw (50'''') include a channel (210'''') configured to allow the fifth pivot (205'''') to move forward and backward relative to the second jaw (50'''').

12. The clamping system of claim 1, wherein the fourth lever arm (150'''') comprises a top portion and a bottom portion, each defining a plane and the two planes are substantially parallel to each other.

13. The clamping system of claim 12, wherein the top and bottom portions of the fourth lever arm (150'''') are positioned on the outside of the second jaw (50'''').

14. The clamping system of claim 13, wherein the third lever arm (180'''') is positioned between the planes defined by the top and bottom portions of the fourth lever arm (150'''').

15. The clamping system of claim 1, wherein the adjustment element (170'''') comprises a rotatable, threaded element.

16. A clamping system comprising:
a first jaw (40'''') having first and second ends;
a second jaw (50'''') having first and second ends, the second jaw (50'''') being pivotally connected to the first jaw (40'''') at a first pivot (100'''') located at the respective first ends of the first and second law (40'''',50'''');
a first lever arm (114'''') having first and second ends; and
a second lever arm (130'''') having first and second ends; and
a third lever arm (180'''') having first and second ends;
wherein the second end of the first lever arm (114'''') is pivotally connected to both the first law (40'''') and the first end of the second lever arm (130'''') at a first pivot (112'''');
wherein the first end of the first lever arm (114'''') is pivotally connected to the second end of the third lever arm (180'''') at a second pivot (142'''');
wherein the second end (134'''') of the second lever arm (130'''') and the first pivot (112'''') define a first imaginary line (138'''');
wherein the first pivot (112'''') and the second pivot (142'''') define a second imaginary line (118''''); and
wherein the clamping system occupies an open configuration when an angle between the first and second imaginary lines (138'''', 118'''') is greater than 0° and the clamping system occupies a closed configuration when an angle between the first and second imaginary lines (138'''', 118'''') is less than 0°.

17. The clamping system of claim 16 further comprising an adjustment element (170'''') pivotally secured to the first end of the third lever arm (180''''), wherein the adjustment element (170'''') is configured to adjust the relative positions of the first pivot (112''''), the second pivot (142''''), and the second end of the second lever arm (130'''').

18. A clamping system comprising:
a first jaw (40'''') having first and second ends;
a second jaw (50'''') having first and second ends, the second jaw (50'''') being pivotally connected to the first jaw (40'''') at a first pivot (100'''') located at the respective first ends of the first and second jaw (40'''',50'''');
a first lever arm (114'''') having first and second ends; and
a second lever arm (130'''') having first and second ends; and
a third lever arm (180'''') having first and second ends;
wherein the second end of the first lever arm (114'''') is pivotally connected to both the first jaw (40'''') and the first end of the second lever arm (130'''') at a first pivot (112'''');
wherein the first end of the first lever arm (114'''') is pivotally connected to the second end of the third lever arm (180'''') at a second pivot (142'''');
wherein the second end (134'''') of the second lever arm (130'''') and the second end (225'''') of the fourth lever arm (150'''') define an imaginary line (111''''); and
wherein the clamping system occupies an open configuration when the first pivot (112'''') is positioned below the imaginary line (111'''') and the clamping system occupies a closed configuration when the first pivot (112'''') is positioned above the imaginary line (111'''').

19. The clamping system of claim 18 further comprising an adjustment element (170'''') pivotally secured to the first end of the third lever arm (180''''), wherein the adjustment element (170'''') is configured to adjust the relative positions of the first pivot (112''''), the second end (225'''') of the fourth lever arm (150''''), and the second end of the second lever arm (130'''').

* * * * *